(12) United States Patent
Nadakuduti et al.

(10) Patent No.: US 12,507,184 B2
(45) Date of Patent: *Dec. 23, 2025

(54) TIME-AVERAGED RADIO FREQUENCY (RF) EXPOSURE PER ANTENNA GROUP

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US); Troy Curtiss, Boulder, CO (US); Akhil Deodhar, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,179

(22) Filed: Feb. 5, 2024

(65) Prior Publication Data

US 2024/0244541 A1 Jul. 18, 2024

Related U.S. Application Data

(63) Continuation of application No. 17/412,111, filed on Aug. 25, 2021, now Pat. No. 11,917,559.

(Continued)

(51) Int. Cl.
*H04W 52/38* (2009.01)
*H04B 1/3827* (2015.01)
*H04W 52/36* (2009.01)

(52) U.S. Cl.
CPC .......... *H04W 52/38* (2013.01); *H04B 1/3838* (2013.01); *H04W 52/367* (2013.01)

(58) Field of Classification Search
CPC ... H04B 1/3827; H04B 1/3838; H04W 52/38; H04W 52/36; H04W 52/367
See application file for complete search history.

(56) References Cited

U.S. PATENT DOCUMENTS 8,073,068 B2 12/2011 Kim et al.
9,237,531 B2 1/2016 Lu et al.
(Continued)

FOREIGN PATENT DOCUMENTS

CN 105359420 A 2/2016
CN 109997318 A 7/2019
(Continued)

OTHER PUBLICATIONS

Ericsson: "Performance of P-MPR-Aware Multi-Panel Scheduling", 3GPP Draft, 3GPP TSG-RAN WG1 Meeting #97, Tdoc R1-1907476 Performance of P-MPR-Aware Multi-Panel Scheduling, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019 May 13, 2019 (May 13, 2019), XP051728907, 5 Pages, Section 2.

(Continued)

*Primary Examiner* — Hai V Nguyen
(74) *Attorney, Agent, or Firm* — Patterson & Sheridan, L.L.P/Qualcomm Incorporated

(57) ABSTRACT

Certain aspects of the present disclosure provide techniques for radio frequency (RF) exposure with antenna grouping. An example method for grouping antennas for RF exposure compliance by a processing system generally includes determining RF exposure distributions per transmit antenna configuration for a plurality of transmit antennas and assigning the plurality of transmit antennas to a plurality of antenna groups based on the RF exposure distributions.

20 Claims, 11 Drawing Sheets

Related U.S. Application Data

(60) Provisional application No. 63/173,086, filed on Apr. 9, 2021, provisional application No. 63/170,414, filed on Apr. 2, 2021, provisional application No. 63/077,460, filed on Sep. 11, 2020, provisional application No. 63/070,268, filed on Aug. 26, 2020.

(56) References Cited

U.S. PATENT DOCUMENTS

| | | | |
|---|---|---|---|
| 10,148,304 B2 * | 12/2018 | Chang | H04W 52/367 |
| 10,447,413 B1 * | 10/2019 | Nadakuduti | H04B 17/18 |
| 10,673,136 B1 | 6/2020 | Shiao et al. | |
| 10,939,387 B2 * | 3/2021 | Jadhav | H04W 52/367 |
| 10,965,335 B1 | 3/2021 | Jadhav et al. | |
| 10,966,188 B2 * | 3/2021 | Chang | H04L 67/12 |
| 10,973,014 B2 * | 4/2021 | Chang | H04L 5/0055 |
| 10,985,617 B1 * | 4/2021 | Johnston | H02J 50/005 |
| 11,585,889 B2 * | 2/2023 | Gulati | H04K 3/28 |
| 11,917,559 B2 * | 2/2024 | Nadakuduti | H04B 1/3838 |
| 12,177,797 B2 * | 12/2024 | Nadakuduti | H04W 52/146 |
| 2005/0052991 A1 | 3/2005 | Kadous | |
| 2010/0297971 A1 | 11/2010 | Persson | |
| 2011/0267222 A1 * | 11/2011 | Craig | G01S 3/04 342/28 |
| 2012/0021800 A1 | 1/2012 | Wilson et al. | |
| 2012/0175223 A1 | 7/2012 | Breen et al. | |
| 2012/0178494 A1 | 7/2012 | Haim et al. | |
| 2012/0231784 A1 | 9/2012 | Kazmi | |
| 2014/0146919 A1 | 5/2014 | Li et al. | |
| 2015/0036509 A1 | 2/2015 | Lopes et al. | |
| 2016/0174162 A1 * | 6/2016 | Nadakuduti | H04W 24/02 455/67.11 |
| 2017/0064641 A1 | 3/2017 | Logan et al. | |
| 2018/0235022 A1 | 8/2018 | Wu et al. | |
| 2018/0316379 A1 * | 11/2018 | Chang | H01Q 1/245 |
| 2018/0359048 A1 | 12/2018 | Stephenne | |
| 2019/0020121 A1 | 1/2019 | Paulotto et al. | |
| 2019/0074889 A1 * | 3/2019 | Colombi | H01Q 3/24 |
| 2019/0200365 A1 | 6/2019 | Sampath et al. | |
| 2019/0222326 A1 * | 7/2019 | Dunworth | H04B 17/13 |
| 2019/0254013 A1 * | 8/2019 | Chang | H04L 5/00 |
| 2019/0373587 A1 * | 12/2019 | Chang | H04L 67/12 |
| 2020/0010232 A1 | 1/2020 | Etem et al. | |
| 2020/0015171 A1 | 1/2020 | Nadakuduti et al. | |
| 2020/0107274 A1 * | 4/2020 | Jadhav | H04W 52/367 |
| 2020/0205087 A1 | 6/2020 | Hong | |
| 2020/0220592 A1 * | 7/2020 | Ryu | H04B 7/0691 |
| 2020/0300996 A1 * | 9/2020 | Cetinoneri | G01S 7/024 |
| 2020/0336110 A1 | 10/2020 | Drogi et al. | |
| 2020/0389856 A1 | 12/2020 | Yao et al. | |
| 2021/0168230 A1 | 6/2021 | Baker et al. | |
| 2021/0194740 A1 * | 6/2021 | Aldana | H04W 16/14 |
| 2021/0195439 A1 * | 6/2021 | Prabhakar | H04W 52/0222 |
| 2022/0014344 A1 * | 1/2022 | Zhang | H04L 5/0048 |
| 2022/0021409 A1 * | 1/2022 | Nadakuduti | H04W 52/38 |
| 2022/0046677 A1 * | 2/2022 | Talarico | H04W 72/23 |
| 2022/0053367 A1 * | 2/2022 | Rao | H04L 1/188 |
| 2022/0070795 A1 * | 3/2022 | Nadakuduti | H04W 52/38 |
| 2022/0070796 A1 * | 3/2022 | Nadakuduti | H04B 7/0404 |
| 2022/0116949 A1 * | 4/2022 | Nadakuduti | H04W 72/0473 |
| 2022/0225455 A1 * | 7/2022 | Jain | H04W 76/16 |
| 2022/0330261 A1 * | 10/2022 | Yeo | H04W 72/543 |
| 2022/0344807 A1 * | 10/2022 | You | H01Q 3/24 |
| 2023/0139016 A1 * | 5/2023 | Nadakuduti | H04W 52/283 370/318 |
| 2023/0396279 A1 * | 12/2023 | Lu | H04W 52/34 |
| 2024/0244541 A1 * | 7/2024 | Nadakuduti | H04B 7/0404 |
| 2024/0298274 A1 * | 9/2024 | Nadakuduti | H04W 52/367 |
| 2025/0106788 A1 * | 3/2025 | Nadakuduti | H04B 7/0608 |

FOREIGN PATENT DOCUMENTS

| | | | |
|---|---|---|---|
| JP | 2015162733 A | 9/2015 | |
| TW | 201828746 A | 8/2018 | |
| WO | 2007024913 A1 | 3/2007 | |
| WO | 2017196612 A1 | 11/2017 | |
| WO | WO-2018191036 A1 | 10/2018 | |
| WO | 2020010232 A1 | 1/2020 | |
| WO | WO-2024186698 A1 * | 9/2024 | H04W 52/146 |

OTHER PUBLICATIONS

International Preliminary Report on Patentability—PCT/US2021/047683—The International Bureau of WIPO—Geneva, Switzerland—Mar. 9, 2023.

International Search Report and Written Opinion—PCT/US2021/047683—ISA/EPO—Dec. 6, 2021.

International Search Report and Written Opinion—PCT/US2021/047750—ISA/EPO—Dec. 3, 2021.

Thors B., et al., "Exposure to RF EMF from Array Antennas in 5G Mobile Communication Equipment", IEEE, 2016, pp. 1-9.

Taiwan Search Report—TW110131641—TIPO—Dec. 21, 2024.

Ericsson: "Performance of P-MPR-Aware Multi-panel Scheduling", 3GPP TSG-RAN WG1 Meeting #97, Tdoc R1-1907476, Reno, USA, May 13, 2019-May 17, 2019, May 4, 2019, 5 Pages, Parts 1-2.

* cited by examiner

TIME-AVERAGED RADIO FREQUENCY (RF) EXPOSURE PER ANTENNA GROUP

CROSS-REFERENCE TO RELATED APPLICATION(S)

This application is a continuation of U.S. application Ser. No. 17/412,111, filed Aug. 25, 2021, which claims the benefit of and priority to U.S. Provisional Application No. 63/070,268, filed Aug. 26, 2020; U.S. Provisional Application No. 63/077,460, filed Sep. 11, 2020; U.S. Provisional Application No. 63/170,414, filed Apr. 2, 2021; and U.S. Provisional Application No. 63/173,086, filed Apr. 9, 2021, each of which is hereby expressly incorporated by reference herein in its entirety as if fully set forth below and for all applicable purposes.

BACKGROUND

Field of the Disclosure

Aspects of the present disclosure relate to wireless communications, and more particularly, to radio frequency (RF) exposure with antenna grouping.

Description of Related Art

Wireless communication systems are widely deployed to provide various telecommunication services such as telephony, video, data, messaging, broadcasts, etc. Modern wireless communication devices (such as cellular telephones) are generally required to meet radio frequency (RF) exposure limits set by domestic and international standards and regulations. To ensure compliance with the standards, such devices must currently undergo an extensive certification process prior to being shipped to market. To ensure that a wireless communication device complies with an RF exposure limit, techniques have been developed to enable the wireless communication device to assess RF exposure from the wireless communication device in real time and adjust the transmission power of the wireless communication device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include mutually exclusive antenna grouping and desirable transmit power using the antenna grouping.

Certain aspects of the subject matter described in this disclosure can be implemented in a method of wireless communication by a user equipment. The method generally includes accessing a stored backoff factor associated with an antenna group among a plurality of antenna groups. The method also includes transmitting, from at least one transmit antenna in the antenna group, a signal at a transmission power level based on the backoff factor in compliance with an RF exposure requirement.

Certain aspects of the subject matter described in this disclosure can be implemented by an apparatus. The apparatus generally includes a memory, a processor, and a transmitter. The processor is coupled to the memory, and the processor and the memory are configured to access a stored backoff factor associated with an antenna group among a plurality of antenna groups. The transmitter is configured to transmit, from at least one transmit antenna in the antenna group, a signal at a transmission power level based on the backoff factor in compliance with an RF exposure requirement.

Certain aspects of the subject matter described in this disclosure can be implemented by an apparatus. The apparatus generally includes means for accessing a stored backoff factor associated with an antenna group among a plurality of antenna groups and means for transmitting, from at least one transmit antenna in the antenna group, a signal at a transmission power level based on the backoff factor in compliance with an RF exposure requirement.

Certain aspects of the subject matter described in this disclosure can be implemented by a computer-readable medium having instructions stored thereon for accessing a stored backoff factor associated with an antenna group among a plurality of antenna groups, and transmitting, from at least one transmit antenna in the antenna group, a signal at a transmission power level based on the backoff factor in compliance with a radio frequency (RF) exposure requirement.

Certain aspects of the subject matter described in this disclosure can be implemented in a method for grouping antennas for radio frequency (RF) exposure compliance by a processing system. The method generally includes determining RF exposure distributions per transmit antenna configuration for a plurality of transmit antennas and assigning the plurality of transmit antennas to a plurality of antenna groups based on the RF exposure distributions.

Certain aspects of the subject matter described in this disclosure can be implemented by an apparatus for grouping antennas of a wireless communication device. The apparatus generally includes a memory and a processor coupled to the memory. The processor and the memory are configured to determine RF exposure distributions per transmit antenna configuration for a plurality of transmit antennas of a wireless communication device and to assign the plurality of transmit antennas to a plurality of antenna groups based on the RF exposure distributions.

Certain aspects of the subject matter described in this disclosure can be implemented by an apparatus for grouping antennas of a wireless communication device. The apparatus generally includes means for determining RF exposure distributions per transmit antenna configuration for a plurality of transmit antennas and means for assigning the plurality of transmit antennas to a plurality of antenna groups based on the RF exposure distributions.

Certain aspects of the subject matter described in this disclosure can be implemented by a computer-readable medium having instructions stored thereon for determining RF exposure distributions per transmit antenna configuration for a plurality of transmit antennas of a wireless communication device and for assigning the plurality of transmit antennas to a plurality of antenna groups based on the RF exposure distributions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
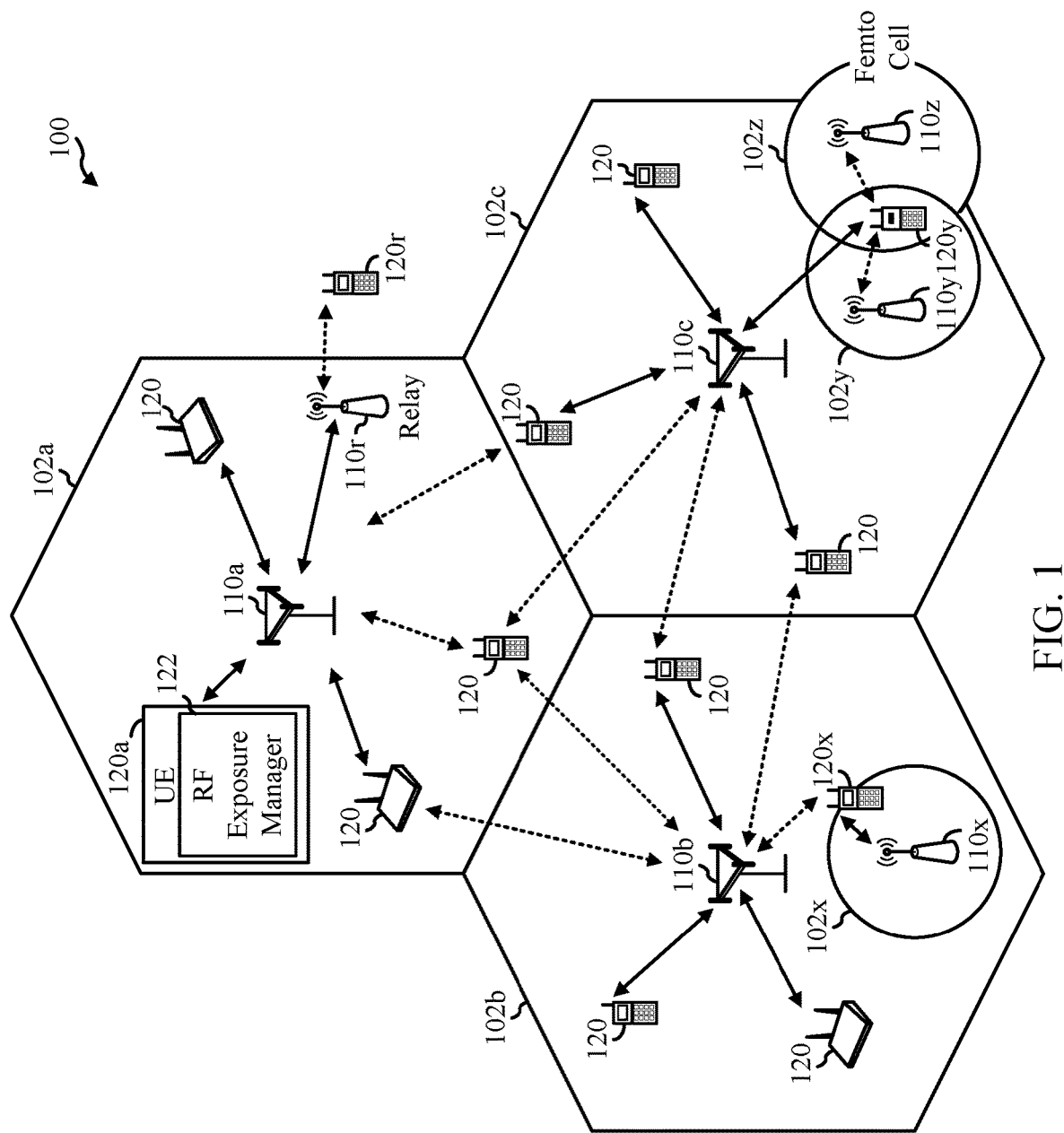
FIG. 1 is a block diagram conceptually illustrating an example wireless communication network, in accordance with certain aspects of the present disclosure.
Figure 1:
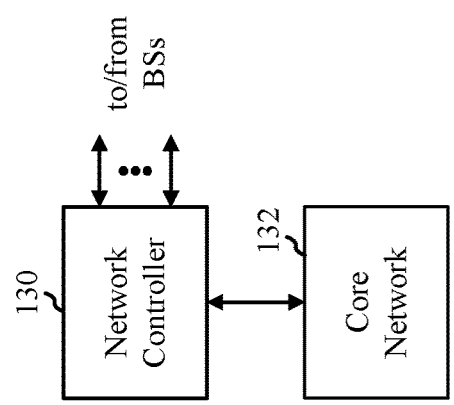

Aspects of the present disclosure provide apparatus, methods, processing systems, and computer-readable mediums for complying with radio frequency (RF) exposure based on antenna groups. In certain cases, antennas may be grouped, for example, using backoff factors to determine the antenna grouping. In aspects, the antenna groups may be defined and/or operated so as to be mutually exclusive in terms of RF exposure. That is, the RF exposure compliance and corresponding transmit power levels may be determined separately for each antenna group. Aspects of the present disclosure provide various techniques for determining time-averaged RF exposure compliance per transmit antenna group. As the antenna grouping described herein may provide mutually exclusive antenna groups, the RF exposure compliance for each antenna group may be determined separately. In certain cases, the RF exposure compliance determination for multiple antenna groups may be conducted in parallel (e.g., concurrently together). The group-based RF exposure compliance described herein may enable desirable transmit power for specific antenna groups, for example, due to differing exposure scenarios encountered by each antenna group. The desirable transmit power may provide desirable uplink performance, such as desirable uplink data rates, uplink carrier aggregation, and/or an uplink connection at the edge of a cell.

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (cMBB) targeting wide bandwidth (e.g., 80 MHz or beyond), millimeter wave (mmWave) targeting high carrier frequency (e.g., 24 GHz to 53 GHZ or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that enforces RF composure compliance per antenna group among mutually exclusive antenna groups, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
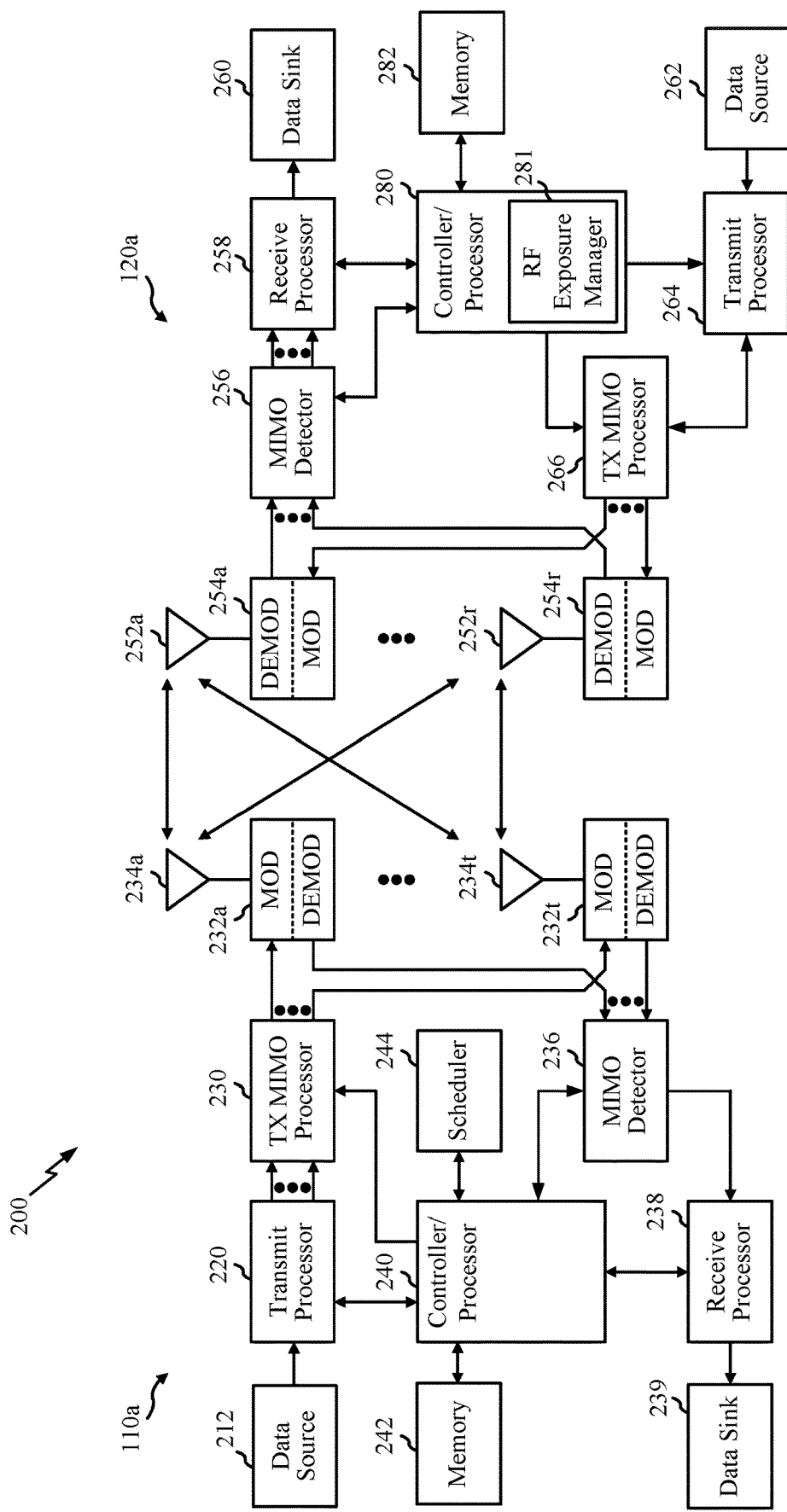
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that enforces RF composure compliance per antenna group among mutually exclusive antenna groups, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

Example RF Transceiver

Figure 3:
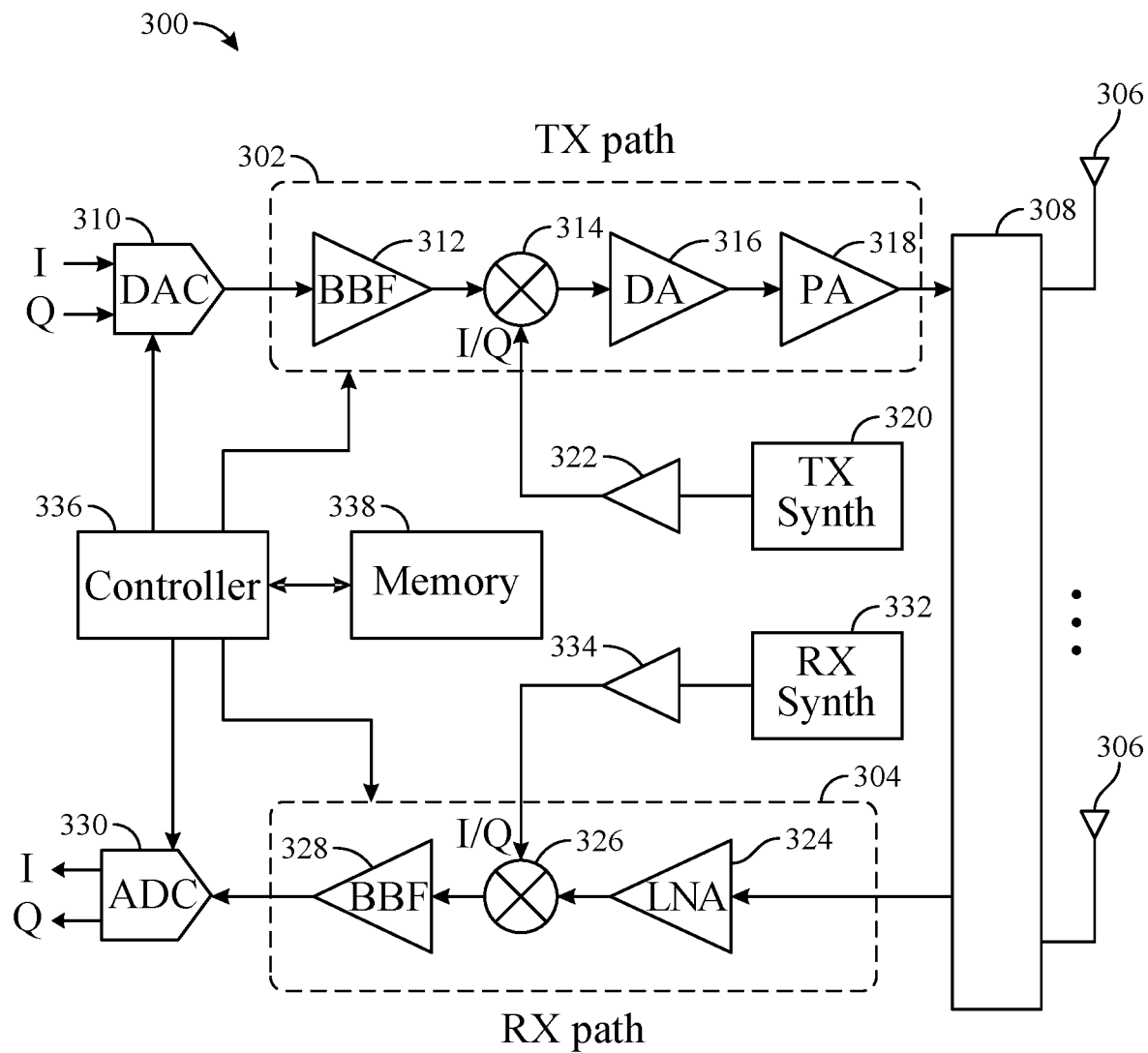
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine time-averaged RF exposure measurements based on transmission power levels applied to the TX path 302 (e.g., certain levels of gain at the PA 318) to set a transmission power level that complies with an RF exposure limit set by domestic regulations and international standards as further described herein.

Example RF Exposure Distributions

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm². In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m²) averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHZ, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120) may simultaneously transmit signals using multiple wireless communication technologies. For example, the wireless communication device may simultaneously transmit signals using a first wireless communication technology operating at or below 6 GHZ (e.g., 3G, 4G, 5G, etc.) and a second wireless communication technology operating above 6 GHZ (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz.

To assess RF exposure from transmissions using the first technology (e.g., 3G, 4G, 5G in sub-6 GHz bands, IEEE 802.11ac, etc.), the wireless communication device may include multiple SAR distributions for the first technology stored in memory (e.g., memory 282 of FIG. 2 or memory 338 of FIG. 3). Each of the SAR distributions may correspond to a respective one of multiple transmit scenarios supported by the wireless communication device for the first technology. The transmit scenarios may correspond to various combinations of antennas (e.g., antennas 252a through 252r of FIG. 2 or antenna 306 of FIG. 3), frequency bands, channels, and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory to enable a processor (e.g., processor 280 of FIG. 2 or controller 336 of FIG. 3) to assess RF exposure in real time, as discussed further below. Each SAR distribution includes a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$\frac{Tx_c}{Tx_{SAR}} \quad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless communication device may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \qquad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SARi}$ is the transmission power level for the SAR distribution for the $i^{th}$ active antenna, and K is the number of the active antennas.

Equation (2) may be rewritten as follows:

$$SAR_{norm\_combined} = \sum_{i=1}^{i=K} \frac{Tx_i}{Tx_{SARi}} \cdot SAR_{norm\_i} \qquad (3a)$$

where $SAR_{norm\_i}$ is the normalized SAR distribution for the $i^{th}$ active antenna. In the case of simultaneous transmissions using multiple active antennas at the same transmitting frequency (e.g., multiple input, multiple output (MIMO)), the combined normalized SAR distribution may be obtained by summing the square root of the individual normalized SAR distributions and computing the square of the sum, as given by the following:

$$SAR_{norm\_combined\_MIMO} = \left[\sum_{i=1}^{i=K} \sqrt{\frac{Tx_i}{Tx_{SARi}} SAR_{norm\_i}}\right]^2. \qquad (3b)$$

In another example, normalized SAR distributions for different frequency bands may be stored in the memory. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using Equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.11ad, 802.11ay, etc.), the wireless communication device may include multiple PD distributions for the second technology stored in the memory (e.g., memory 282 of FIG. 2 or memory 338 of FIG. 3). Each of the PD distributions may correspond to a respective one of multiple transmit scenarios supported by the wireless communication device for the second technology. The transmit scenarios may correspond to various combinations of antennas (e.g., antennas 252a through 252r of FIG. 2 or antenna 306 of FIG. 3), frequency bands, channels, and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions are stored in the memory to enable the processor (e.g., processor 280 of FIG. 2 or controller 336 of FIG. 3) to assess RF exposure in real time, as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \qquad (4)$$

where $Tx_c$ is a current transmission power level for the respective transmit scenario, and $Tx_{PD}$ is the transmission power level corresponding to the PD values in the PD distribution (e.g., the transmission power level at which the PD values were measured in the test laboratory).

As discussed above, the wireless communication device may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless communication device relative to the user's body location (head, trunk, away from the body, etc.), and/or other parameters. In cases where the wireless communication device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory may be normalized with respect to a PD limit.

In certain aspects, the normalized PD distribution for a transmit scenario may be generated by combining two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $Tx_{PDi}$ is the transmission power level for the PD distribution for the $i^{th}$ active antenna, and L is the number of the active antennas.

Equation (5) may be rewritten as follows:

$$PD_{norm\_combined} = \sum_{i=1}^{i=L} \frac{Tx_i}{Tx_{PDi}} \cdot PD_{norm\_i} \quad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution may be obtained by summing the square root of the individual normalized PD distributions and computing the square of the sum, as given by the following:

$$PD_{norm\_combined\_MIMO} = \left[ \sum_{i=1}^{i=L} \sqrt{\frac{Tx_i}{Tx_{PDi}} PD_{norm\_i}} \right]^2. \quad (6b)$$

In another example, normalized PD distributions for different frequency bands may be stored in the memory. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using Equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $Tx_{PDi}$ is the transmission power level for the normalized PD distribution for the $i^{th}$ active frequency band.

Example RF Exposure Combinations

As discussed above, the UE 120 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). In this case, the processor 280 may determine a first maximum allowable power level for the first technology and a second maximum allowable power level for the second technology for transmissions in a future time slot that comply with RF exposure limits. During the future time slot, the transmission power levels for the first and second technologies are constrained (i.e., bounded) by the determined first and second maximum allowable power levels, respectively, to ensure compliance with RF exposure limits, as further below. In the present disclosure, the term "maximum allowable power level" refers to a "maximum allowable power level" imposed by an RF exposure limit unless stated otherwise. It is to be appreciated that the "maximum allowable power level" is not necessarily equal to the absolute maximum power level that complies with an RF exposure limit and may be less than the absolute maximum power level that complies with the RF exposure limit (e.g., to provide a safety margin). The "maximum allowable power level" may be used to set a power level limit on a transmission at a transmitter such that the power level of the transmission is not allowed to exceed the "maximum allowable power level" to ensure RF exposure compliance.

The processor 280 may determine the first and second maximum allowable power levels as follows. The processor may determine a normalized SAR distribution for the first technology at a first transmission power level, determine a normalized PD distribution for the second technology at a second transmission power level, and combine the normalized SAR distribution and the normalized PD distribution to generate a combined normalized RF exposure distribution (referred to simply as a combined normalized distribution below). The value at each location in the combined normalized distribution may be determined by combining the normalized SAR value at the location with the normalized PD value at the location or another technique.

The processor 280 may then determine whether the first and second transmission power levels comply with RF exposure limits by comparing the peak value in the combined normalized distribution with one. If the peak value is equal to or less than one (i.e., satisfies the condition≤1), then the processor 280 may determine that the first and second transmission power levels comply with RF exposure limits (e.g., SAR limit and PD limit) and use the first and second transmission power levels as the first and second maximum allowable power levels, respectively, during the future time slot. If the peak value is greater than one, then the processor 280 may determine that the first and second transmission power levels do not comply with RF exposure limits. The condition for RF exposure compliance for simultaneous transmissions using the first and second technologies may be given by:

$$SAR_{norm} + PD_{norm} \le 1. \quad (7)$$

Figure 4:
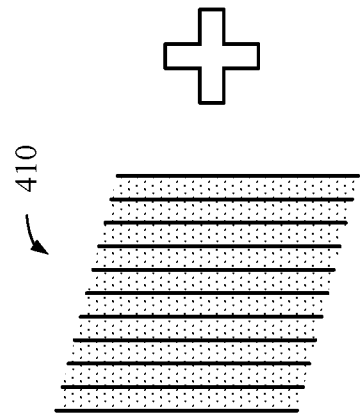
FIG. 4 is a diagram illustrating an example of a normalized specific absorption rate (SAR) distribution combined with a normalized power density (PD) distribution, in accordance with certain aspects of the present disclosure.
Figure 4:
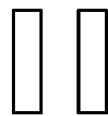
Figure 4:
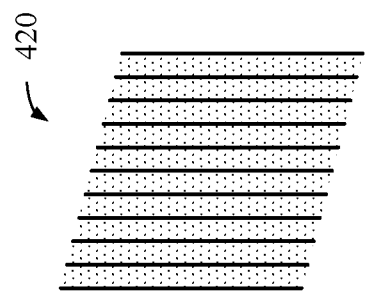
Figure 4:
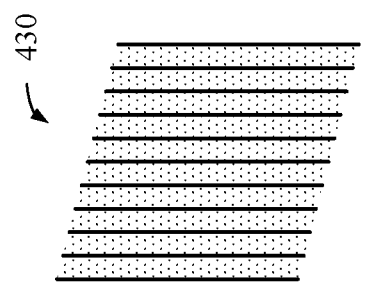

FIG. 4 is a diagram illustrating the normalized SAR distribution 410 and the normalized PD distribution 420, in which the normalized SAR distribution 410 and the normalized PD distribution 420 are combined to generate a combined normalized distribution 430. FIG. 4 also shows the condition that the peak value in the combined normalized distribution 430 be equal to or less than one for RF exposure compliance. Although each of the distributions 410, 420, and 430 is depicted as a two-dimensional distribution in FIG. 4, it is to be appreciated that the present disclosure is not limited to this example.

The normalized SAR distribution in Equation (7) may be generated by combining two or more normalized SAR distributions as discussed above (e.g., for a transmit scenario using multiple active antennas). Similarly, the normalized PD distribution in Equation (7) may be generated by combining two or more normalized PD distributions as discussed above (e.g., for a transmit scenario using multiple active antennas). In this case, the condition for RF exposure compliance in Equation (7) may be rewritten using Equations (3a) and (6a) as follows:

$$\sum_{i=1}^{i=K} \frac{Tx_i}{Tx_{SARi}} \cdot SAR_{norm\_i} + \sum_{i=1}^{i=L} \frac{Tx_i}{Tx_{PDi}} \cdot PD_{norm\_i} \le 1. \quad (8)$$

For the MIMO case, Equations (3b) and (6b) may be combined instead. As shown in Equation (8), the combined normalized distribution may be a function of transmission power levels for the first technology and transmission power levels for the second technology. All the points in the combined normalized distribution should meet the normalized limit of one in Equation (8). Additionally, when combining SAR and PD distributions, the SAR and PD distributions should be aligned spatially or aligned with their peak locations so that the combined distribution given by Equation (8) represents combined RF exposure for a given position of a human body.

Example RF Exposure Measurements

As discussed above, the UE 120 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). The RF exposure measurements may be performed differently for each transmit scenario and include, for example, electric field measurements using a model of a human body. RF exposure distributions (simulation and/or measurement) may then be generated per transmit antenna/configuration (beam) (as described above) on all evaluation surfaces/positions at all locations.

Figure 5:
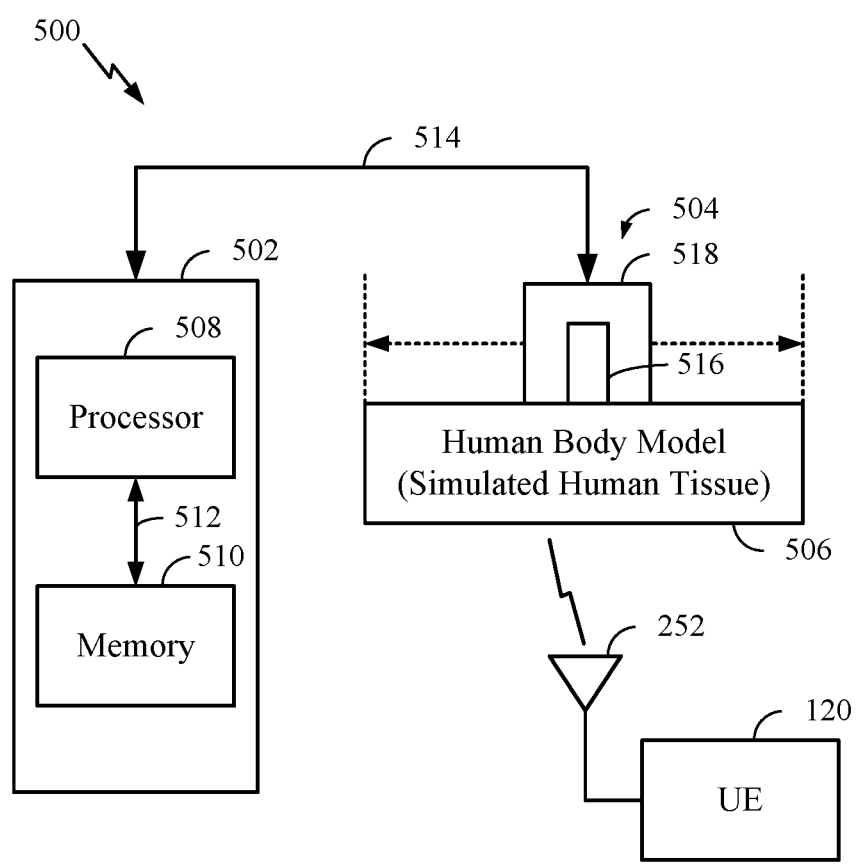
FIG. 5 is a diagram illustrating a system for measuring RF exposure distributions, in accordance with certain aspects of the present disclosure.

FIG. 5 is a diagram illustrating an example system 500 for measuring RF exposure distributions, in accordance with certain aspects of the present disclosure. As shown, the RF exposure measurement system 500 includes a processing system 502, a robotic RF probe 504, and a human body model 506. The RF exposure measurement system 500 may take RF measurements at various transmit scenarios and/or exposure scenarios associated with the UE 120 in order to assess suitable backoff factors for the transmit powers of the antenna(s) 252 in compliance with one or more RF exposure limits. In other words, the UE 120 may emit electromagnetic radiation via the antenna(s) 252 at various transmit powers, and the RF exposure measurement system 500 may take RF measurements via the robotic RF probe 504 to determine the backoff factors for the antenna(s) 252.

The processing system 502 may include a processor 508 coupled to a memory 510 via a bus 512. The processing system 502 may be a computational device such as a computer. The processor 508 may include a central processing unit (CPU), a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. The processor 508 may be in communication with the robotic RF probe 504 via an interface 514 (such as a computer bus interface), such that the processor 508 may obtain RF measurements taken by the robotic RF probe 504 and control the position of the robotic RF probe 504 relative to the human body model 506, for example.

The memory 510 may be configured to store instructions (e.g., computer-executable code) that when executed by the processor 508, cause the processor 508 to perform various operations. For example, the memory 510 may store instructions for obtaining the RF exposure distributions associated with various RF exposure/transmit scenarios and/or adjusting the position of the robotic RF probe 504.

The robotic RF probe 504 may include an RF probe 516 coupled to a robotic arm 518. In aspects, the RF probe 516 may be a dosimetric probe capable of measuring RF exposures at various frequencies such as sub-6 GHz bands and/or mmWave bands. The RF probe 516 may be positioned by the robotic arm 518 in various locations (as indicated by the dotted arrows) to capture the electromagnetic radiation emitted by the antenna(s) 252 of the UE 120. The robotic arm 518 may be a six-axis robot capable of performing precise movements to position the RF probe 516 to the location (on the human body model 506) of maximum electromagnetic field generated by the UE 120. In other words, the robotic arm 518 may provide six degrees of freedom in positioning the RF probe 516 with respect to the antenna(s) 252 of the UE 120 and/or the human body model 506.

The human body model 506 may be a specific anthropomorphic mannequin with simulated human tissue. For example, the human body model 506 may include one or more liquids that simulate the human tissue of the head, body, and/or extremities. The human body model 506 may simulate the human tissue for determining the maximum permissible transmission power of the antenna(s) 252 in compliance with various RF exposure limits.

While the example depicted in FIG. 5 is described herein with respect to obtaining RF exposure distributions with a robotic RF probe to facilitate understanding, aspects of the present disclosure may also be applied to other suitable RF probe architectures, such as using multiple stationary RF probes positioned at various locations along the human body model 506.

Example Transmit Antenna Grouping

Multi-mode/multi-band UEs have multiple transmit antennas, which can simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless communication device may limit maximum transmit power for both sub-6 GHz bands and bands greater than 6 GHZ.

In certain cases, although antennas may be positioned in different locations across a UE, a time-averaging algorithm for RF exposure compliance may assume all transmit antennas are collocated in a central location on the UE. Under such an assumption, the total transmit power of all transmit antennas may be limited regardless of the actual exposure scenario (e.g., head exposure, body exposure, or extremity exposure) of separate antennas. For example, suppose the user's hand covers the location of the collocated model, while specific antennas are not covered by the user's hand. That is, antennas may contribute to the RF exposure differently depending on the location of the exposure. Enforcing the collocated model may lead to limiting the transmit power of specific antennas not actually covered by the user's hand. That is, the assumption that the transmit antennas are collocated for RF exposure compliance may provide a needlessly low transmit power, which may affect uplink performance such as uplink data rates, uplink carrier aggregation, and/or an uplink connection at the edge of a cell.

Aspects of the present disclosure provide various techniques for grouping antennas, for example, to determine RF exposure compliance on a group basis. In aspects, the antenna groups may be defined and/or operated so as to be mutually exclusive of each other in terms of RF exposure. The RF exposure compliance and corresponding transmit power levels may be determined separately for each antenna group. The antenna grouping described herein may enable relatively higher transmit power for specific antenna groups. An antenna grouping may refer to a specific assignment (or grouping) of antennas into separate antenna groups. The higher transmit power may provide desirable uplink performance, such as desirable uplink data rates, uplink carrier aggregation, and/or an uplink connection at the edge of a cell.

In certain aspects, a plurality of antenna groups is defined. Each antenna group may include one or more antennas. For example, the antenna 252*a* may be categorized into a first antenna group, and the antennas 252*t* may be categorized into a second antenna group. In certain aspects, each antenna array (e.g., each phased array) is placed in a different group. The groups may be defined manually, for example by a designer or test operator, or in an automated fashion, for example by an algorithm operating prior to initialization of the device, at initialization, or during operation of the device. The groups may be established based on physical location (as described in greater detail below), operating frequency, form factor, associated method of calculating RF exposure, etc.

Figure 6:
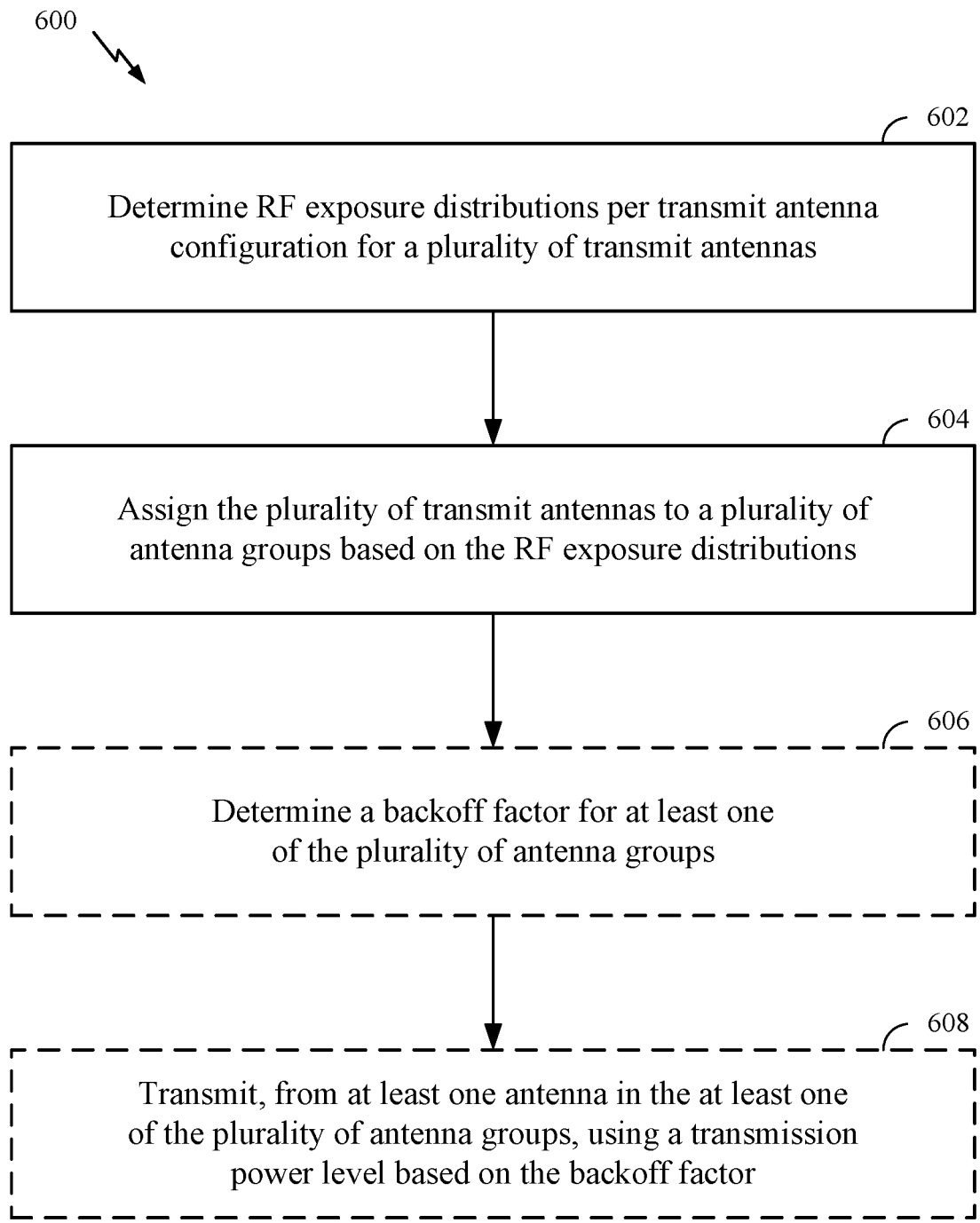
FIG. 6 is a flow diagram illustrating example operations for grouping antennas for RF exposure compliance by a UE, in accordance with certain aspects of the present disclosure.

FIG. 6 is a flow diagram illustrating example operations 600 for grouping antennas for RF exposure compliance, in accordance with certain aspects of the present disclosure. The operations 600 may be performed, for example, by a processing system including a UE (e.g., the UE 120*a* in the wireless communication network 100), an RF exposure measurement system (e.g., the RF exposure measurement system 500), and/or a computational device, such as a computer. The operations 600 may be implemented as software components that are executed and run on one or more processors (e.g., controller/processor 280 of FIG. 2 and/or the processor 508 of FIG. 5). Further, the transmission and/or reception of signals by the UE or the RF exposure testing system in the operations 600 may be enabled, for example, by one or more antennas (e.g., antennas 252 of FIG. 2 and/or the RF probe 516 of FIG. 5). In certain aspects, the transmission and/or reception of signals by the UE may be implemented via a bus interface of one or more processors (e.g., controller/processor 280) obtaining and/or outputting signals.

The operations 600 may begin, at block 602, where the processing system may determine (e.g., generate and/or receive) RF exposure distributions per transmit antenna configuration for a plurality of transmit antennas of a wireless communication device (such as the UE 120 as depicted in FIG. 5). At block 604, the processing system may assign the plurality of transmit antennas to a plurality of antenna groups based on the RF exposure distributions. Optionally, at block 606, the UE and/or processing system may determine a backoff factor for at least one of the plurality of antenna groups, for example, associated with a specific exposure/transmit scenario. At block 608, the UE may transmit, from at least one antenna in the at least one of the plurality of antenna groups, using a transmission power level based on the backoff factor.

Figure 8:
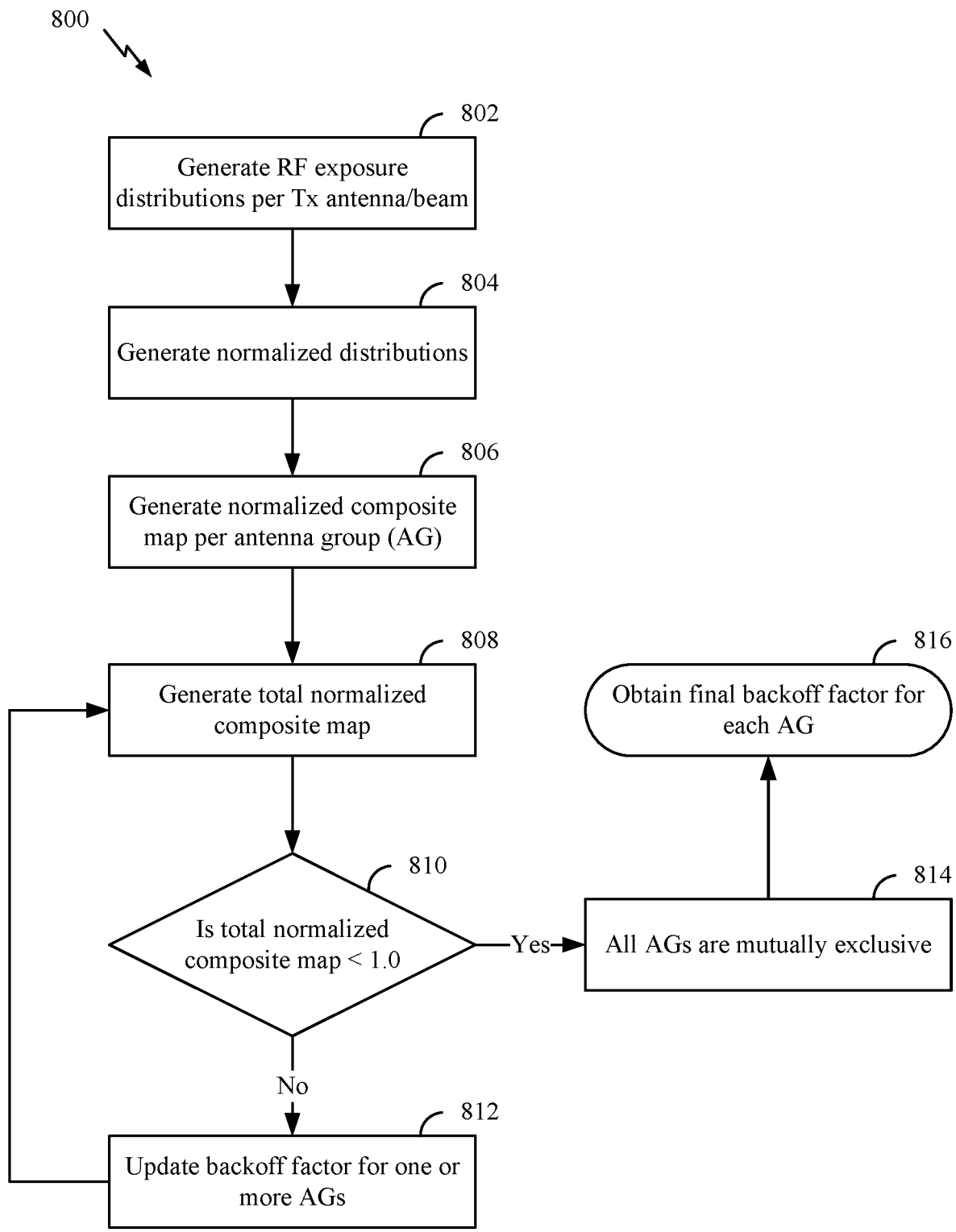
FIG. 8 is a flow diagram illustrating example operations for determining backoff factors for antenna groups, in accordance with certain aspects of the present disclosure.

In certain aspects, assigning the plurality of transmit antennas to the plurality of antenna groups at block 604 may involve the processing system determining backoff factors for each of the antenna groups, for example, as further described herein with respect to FIG. 8. As used herein, a backoff factor may be a specific number representing a fraction (or portion) of a maximum transmit power level supported by a UE, such as a number in the range of 0 to 1. For example, the processing system may generate normalized distributions of the RF exposure distributions, generate a normalized composite map of the normalized distributions for each of the antenna groups, and generate a total of the normalized composite maps for all of the antenna groups based on a backoff factor associated with each of the antenna groups.

In aspects, the normalized distributions may be generated by dividing the RF exposure distributions by a maximum RF exposure value for a corresponding transmit antenna configuration, for example, as described herein with respect to block 802. In aspects, the normalized composite map may be generated by selecting a maximum of the normalized distributions as the normalized composite map for each of the antenna groups, for example, as described herein with respect to block 804.

In certain aspects, generating the total of the normalized composite maps may be generated by multiplying the normalized composite map for each antenna group with the associated backoff factor to generate a weighted normalized composite map for each antenna group and summing the weighted normalized composite maps together, for example, as described herein with respect to block 808. In certain aspects, at least one of the backoff factors may be adjusted and applied to calculating the total of the normalized composite maps until the total of the normalized composite maps is less than or equal to a first threshold (e.g., 1.0). That is, the backoff factors associated with each antenna group may be updated and applied to the calculation of the normalized composite maps until the total of the normalized composite maps is less than or equal to the first threshold.

In certain cases, the processing system may assign each of the plurality of transmit antennas to one of the plurality of antenna groups based on the RF exposure distributions, such that no transmit antenna is in multiple antenna groups. In certain cases, the processing system may assign each of the plurality of transmit antennas to one of the plurality of antenna groups based on the RF exposure distributions, such that there is at least one transmit antenna in multiple antenna groups.

Figure 9:
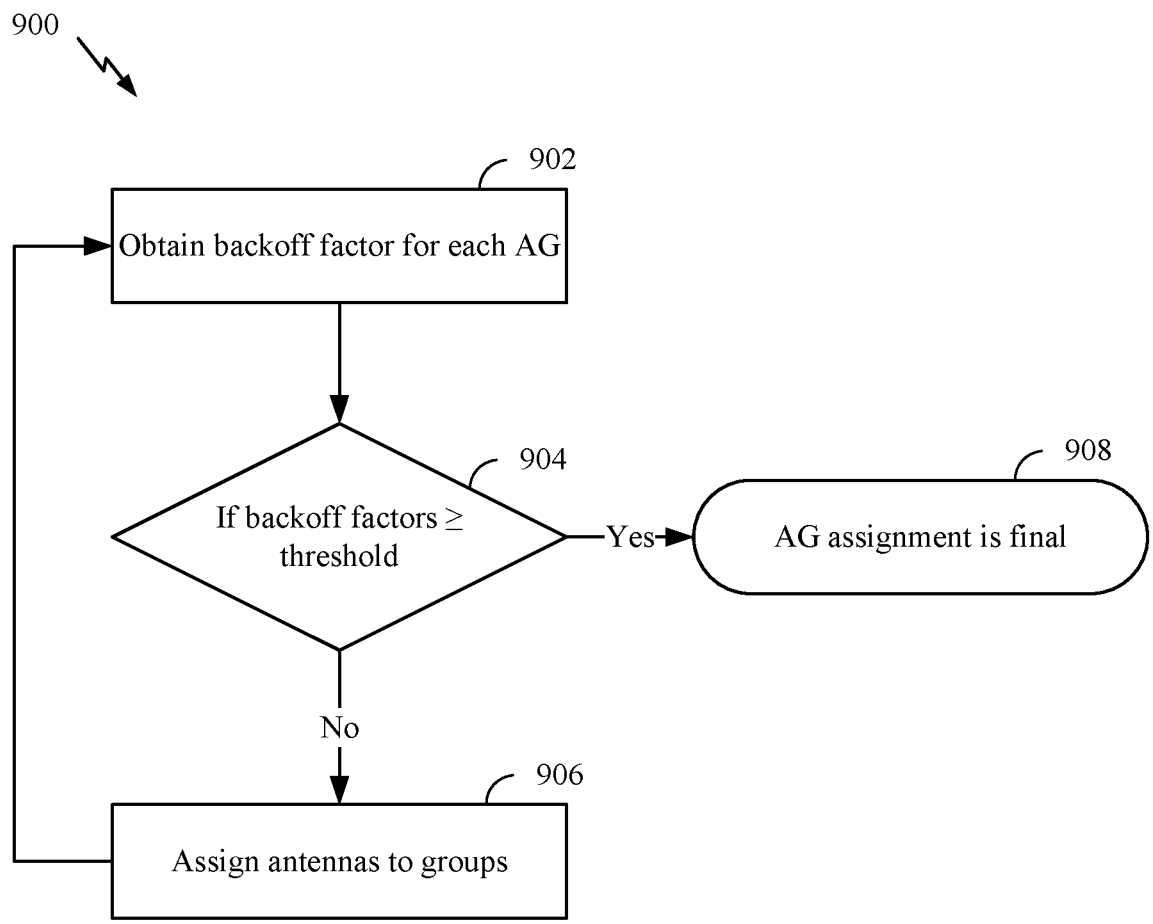
FIG. 9 is a flow diagram illustrating example operations for assigning antennas to groups based on the backoff factors, in accordance with certain aspects of the present disclosure.

In aspects, the plurality of transmit antennas may be assigned to the plurality of antenna groups at block 604 based on the value of the determined backoff factors, for example, as further described herein with respect to FIG. 9. The transmit antennas may be redistributed or regrouped if one of the backoff factors is less than a second threshold (e.g., 0.5). For example, the processing system may determine the backoff factors for a first grouping of the antenna groups, for example, as described herein with respect to FIG. 8, and assign the transmit antennas to a second grouping of the antenna groups, if at least one of the backoff factors for the first grouping is less than a second threshold (e.g., 0.5). In certain cases, the first grouping may include a separate antenna group for each transmit antenna, and the second grouping may include at least one antenna group having multiple transmit antennas. That is, the first iteration of the antenna grouping procedure may involve determining backoff factors for each antenna and determining which transmit antennas to group together based on the backoff factors, and subsequent iterations may refine or adjust the assignment of antennas to specific antenna groups, for example, based on the determined backoff factors.

The processing system may repeat determining the backoff factors and assigning the transmit antennas to antenna groups until all of the backoff factors are greater than the second threshold. For example, the processing system may determine the backoff factors for the second grouping of the antenna groups, (e.g., repeating the operations described herein with respect to FIG. 8) and assign the transmit antennas to a third grouping of the antenna groups, if at least one of the backoff factors for the second grouping is less than the threshold. In certain cases, the third grouping may include at least two antenna groups having multiple transmit antennas in each of the at least two antenna groups. That is, the assignment of the third grouping may further refine the antenna groups to include multiple antennas in more than two antenna groups.

In certain aspects, an antenna group may include mixed-mode antennas (e.g., sub-6 GHz and mm Wave antennas). For example, at least one of the antenna groups may comprise a first antenna configured to transmit in a first mode and a second antenna configured to transmit in a second mode. The first mode may be a sub-6 GHz band transmission mode, and the second mode may be a mmWave band transmission mode. In other words, the first mode may be transmitting at one or more frequencies at or below 6 GHz (for example, 300 MHz to 6 GHZ), and the second mode may be transmitting at one or more frequencies above 6 GHz (for example, 24 GHz to 53 GHz or beyond). That is, the first mode may include the first antenna being operable at one or more frequencies at or below 6 GHz, and the second mode may include the second antenna being operable at one or more frequencies above 6 GHZ.

In aspects, a transmit antenna configuration may include a specific antenna or a transmit beam configuration of an antenna module having multiple antennas. In aspects, at least one of the transmit antennas is part of an antenna module having multiple antennas. As an example, at block 602, RF exposure distributions may be generated (and/or indications thereof may be received) for each antenna in the plurality of antennas and/or for each transmit beam configuration supported by an antenna module among the plurality of antennas. In aspects, a transmit beam configuration may refer to a transmit radiation pattern from an antenna or antenna module in a certain azimuthal direction and/or elevation direction, which may be realized through beamforming. A transmit beam configuration may have a certain transmit power spread (e.g., a power angular spread associated with an angle of departure) in an azimuthal direction and/or elevation direction.

In certain cases, the antenna grouping may be used to determine RF exposure compliance and corresponding transmit power levels. For example, the UE may transmit a signal at a transmission power level based on enforcing the RF exposure compliance for at least one of the antenna groups. In certain aspects, enforcing the RF exposure compliance may include the UE transmitting the signal at the transmission power level that satisfies a certain RF exposure limit (e.g., a SAR limit of 1.6 watts per kilogram (1.6 W/kg) and/or a PD limit of 1.0 milliwatts per square centimeter (1.0 $mW/cm^2$)).

In aspects, ensuring the RF exposure compliance may include evaluating the RF exposure compliance in terms of time-averaged RF exposure such as a time-averaged SAR or a time-averaged PD over a time window. In aspects, the time window may be in a range from 1 second to 360 seconds. For example, the time window may be 100 seconds or 360 seconds. The range from 1 second to 360 seconds is an example, and other suitable values for the time window may be used. In certain cases, the time window may be less than 1 second, such as 500 milliseconds. In certain cases, the time window may be greater than 360 seconds, such as 600 seconds.

In aspects, the UE may be communicating with a base station, such as the BS 110. For example, at block 608, the UE may be transmitting, to the base station, user data on a physical uplink shared channel (PUSCH) or various uplink feedback (e.g., uplink control information or hybrid automatic repeat request (HARQ) feedback) on a physical uplink control channel (PUCCH). In certain cases, the UE may be communicating with another UE. For example, at block 608, the UE may be transmitting, to the other UE, user data and/or various feedback on sidelink channels.

Figure 7:
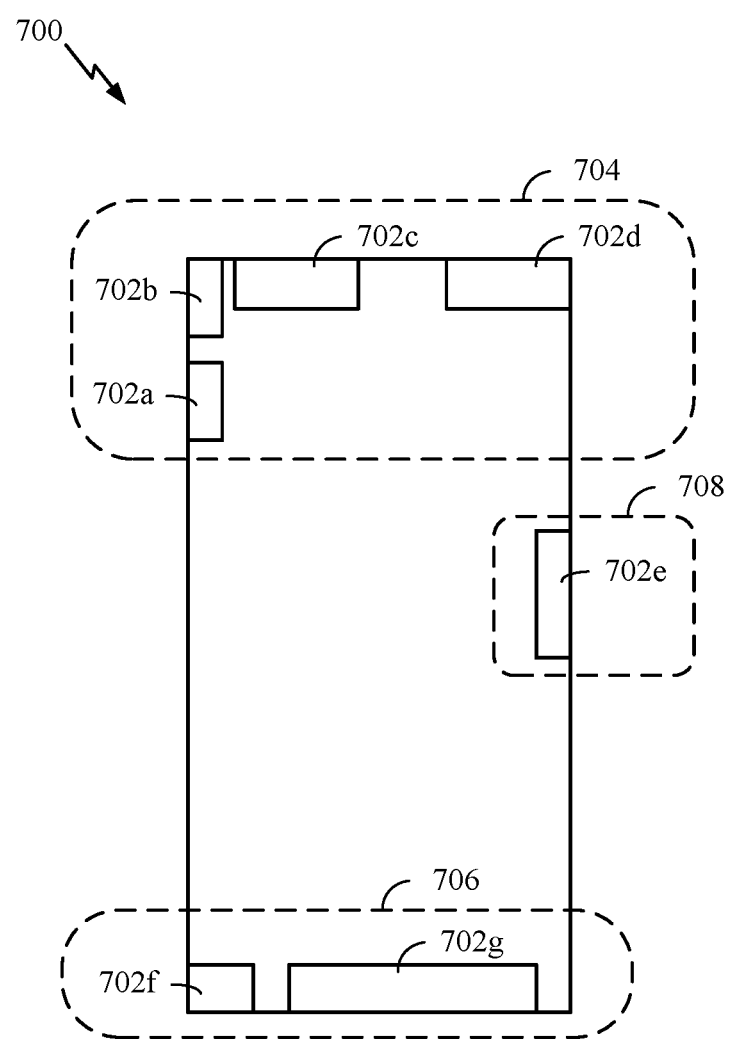
FIG. 7 is a block diagram illustrating an example grouping of multiple antennas of a wireless communication device, in accordance with certain aspects of the present disclosure.

FIG. 7 is a block diagram illustrating an example grouping of multiple antennas of a wireless communication device 700, in accordance with certain aspects of the present disclosure. In this example, the wireless communication device 700 (e.g., a UE 120, such as a smartphone, or any of the wireless communication devices described herein) includes a first antenna 702*a*, a second antenna 702*b*, a third antenna 702*c*, a fourth antenna 702*d*, a fifth antenna 702*e*, a sixth antenna 702*f*, and a seventh antenna 702*g*. In this example, the antennas 702*a*-702*g* are separated into three antenna groups 704, 706, 708, which roughly correspond to a top of the device 700, a bottom of the device 700, and a side of the device 700, when the device 700 is held in the upright position. Those of skill in the art will appreciate that more or less than seven antennas may be implemented, and/or more or less than three antenna groupings may be defined. Each of the illustrated antennas 702*a*-702*g* may represent a single antenna, an array (e.g., a phased array) of antennas, or a module including one or more antennas. The antenna groups 704, 706, 708 may each include one or more antennas that are configured to transmit in a certain frequency band (e.g., very high (e.g., mmWave bands), high (e.g., 6-7 GHz bands), medium (e.g., 3-6 GHz bands), or low (e.g., 400 MHZ-3 GHz bands)), or the antenna groups may each include one or more antennas that are configured to transmit in multiple frequency bands.

In aspects, the mutually exclusive antenna groupings described herein may be assigned into various antenna groupings (such as a mmWave grouping, a sub-6 GHZ grouping, a low band grouping (e.g., 400 MHz-3 GHz bands), a mixed-mode grouping (e.g., mmWave and sub-6 GHz grouping)), for example, for differing transmit scenarios. As an example, under a mm Wave grouping, each mmWave module (e.g., the first antenna 702a, the third antenna 702c, and the fifth antenna 702e) may be treated as a separate antenna group, where each mmWave module may have multiple antenna elements (e.g., 64 dual polarization antenna elements) arranged in one or more arrays. The mmWave module may be capable of transmitting various beams via predefined antenna configurations, where the beams may form a codebook. Under a sub-6 GHz grouping, sub-6 GHz antennas may be grouped into separate groups. For example, the second and fourth antennas 702b, 702d may be assigned to a group, and the sixth and seventh antennas 702f, 702g may be assigned to another group. In certain cases, the antennas 702a-702g may be assigned to a mixed-mode grouping, such as the three antenna groups 704, 706, 708.

The groups may be defined and/or operated so as to be mutually exclusive in terms of RF exposure. In certain aspects, the transmit power of one or more of the groups (or of one or more of the antennas within one or more groups) may be reduced such that the (normalized) sum of the exposure of all antenna groups, or of the overlapped RF exposure distributions, are less than a particular value (e.g., 1.0). For example, backoff factors may be determined for one or more groups, or one or more antennas within one or more groups, and applied so as to limit transmission power for the antenna(s) and/or groups.

As an example, the backoff factor bf may be between [0, 1] for each antenna group, such that the maximum permissible transmit power for each antenna group equals the respective backoff factor times the transmit power limit of the antenna group (e.g., bf*Tx_power_limit), where bf=1 represents no backoff, where bf=0.3 signifies to operate the antenna group at 30% of the transmit power limit, and where the transmit power limit may be the maximum transmit power supported by that particular antenna and/or antenna group.

FIG. 8 is a flow diagram illustrating example operations 800 for determining backoff factors for antenna groups, in accordance with certain aspects of the present disclosure. The operations 800 may be performed, for example, by a UE (e.g., the UE 120a in the wireless communication network 100), an RF exposure measurement system (e.g., the RF exposure measurement system 500), and/or a processing system. In order to determine such backoff factors, at block 802, RF exposure distributions (simulation and/or measurement) may be generated per transmit antenna/configuration (beam) (as described above) on all evaluation surfaces/positions at all locations, for example, using a processing system and/or the RF exposure measurement system 500. In certain aspects, the RF exposure distributions may be generated via simulations, such as a simulation of the various exposure/transmit scenarios using a model of the human body being exposed to electromagnetic radiation from a wireless communication device. As previously described herein, an RF exposure distribution may include the RF exposure associated with various transmit scenarios that correspond to specific frequency bands and/or human body positions relative to the antenna. For example, the RF exposure distributions may be represented by the expression: RFexp(s,x,y,z,i), where s represents a particular surface or position, (x, y, z) represent a given location, and i represents a particular transmit configuration, such as a specific antenna or transmit beam. In certain cases, a transmit antenna may support multiple bands, so multiple RF exposure distributions for each band/channel (low/mid/high) may be available for a specific transmit antenna. In that case, the RF exposure distribution for a specific transmit antenna can represent the maximum exposure out of all technologies/bands/channels supported by the transmit antenna at each location/exposure surface.

Then, at block 804, normalized distributions (maps) may be calculated by collecting exposures on all surfaces/positions per transmit antenna/beam and dividing by the corresponding maximum value. For example, the normalized distributions may be represented by the expression: normalized.map(s,x,y,z,i)={RFexp(1,x,y,z,i); RFexp(2,x,y,z,i); . . . ; RFexp(s,x,y,z,i)}/maxRFexp(i).

Thereafter, at block 806, a normalized composite map per antenna group may be calculated, for example based on a maximum of the normalized distributions in the group. That is, generating the normalized composite map may include selecting the maximum normalized distribution among the normalized distributions in a particular antenna group. For example, a normalized composite map may be given by the expression: normalized.composite.map.$AG_k$ (s,x,y,z)=maximum {normalized.map(s,x,y,z,i), for all i=1 to n antennas/beams inside $AG_k$}, where $AG_k$ represents a specific antenna group (AG).

Further, at block 808, a total normalized composite map may be calculated for all of the antenna groups, for example based on a sum of all of the normalized composite maps. As an example, the total normalized composite map may be given by the expression:

$$\text{Total.normalized.composite.map}(s, x, y, z) = \sum_{k=1}^{M} \{bf_k * \text{normalized.composite.map}.AG_k(s, x, y, z)\}$$

where $bf_k$ represents the backoff factor for a specific antenna group.

In certain aspects, at block 810, it may be determined whether the total normalized composite map is less than a threshold (for example, 1.0). If this condition is not satisfied, the expected or potential power for one or more antennas (or one or more antenna groups) may be reduced using an updated backoff factor. Antenna groups may contribute to the RF exposure at different levels, for example, due to the location of the antennas within a group, the supported bands of the antennas within the group, the maximum transmit power of the antennas within the group, etc. The contribution of an antenna group to the RF exposure (e.g., based on the total normalized composite map, where overlapping maps are at a peak, etc.) may be adjusted using the backoff factor for the antenna group. At block 812, for example, backoff factor(s) may be adjusted (increased or decreased) for one or more of the antenna groups, and the total normalized composite map may be recalculated using the updated backoff factors at block 808. The backoff factor for each antenna and/or group may be adjusted (or updated), and the total normalized composite map may be recalculated using the adjusted backoff factors, until the condition (e.g., the total normalized composite map being less than or equal to the threshold) at block 810 is satisfied. In some examples, the backoff factor for each transmitter (or antenna, or group of antennas or transmitters) may be determined based on a proportion of RF exposure attributable to each transmitter at a (e.g., peak) location and an amount of desired reduction in exposure. In some examples, the backoff factor may be determined based on a priority of a transmitter coupled to an antenna. In some examples, the backoff factor for an antenna that contributes most to the RF exposure at a (e.g., peak) is the largest backoff factor as compared to backoff factors for other antennas or groups. In some examples, the backoff factors are determined such that transmission power level for each one of several antennas or groups contribute approximately equally to RF exposure at a location. Backoff factors may be determined or applied uniformly to antennas in a group, or may vary across antennas in the group.

At block 814, if the total normalized composite map is less than the threshold (for example, 1.0), the antenna groups are considered to be mutually exclusive in terms of RF exposure, and at block 816, the final backoff factors for each antenna group may be obtained. The backoff factors may be used for determining transmission power levels for specific antenna groups, as further described herein, or for other purposes such as determining actual or potential interference.

FIG. 9 is a flow diagram illustrating example operations 900 for assigning antennas to groups based on the backoff factors (for example as determined in the operations 800), in accordance with certain aspects of the present disclosure. The operations 900 may be performed, for example, by a processing system including a UE (e.g., the UE 120a in the wireless communication network 100) and/or an RF exposure measurement system (e.g., the RF exposure measurement system 500).

At block 902, the backoff factor(s) for each antenna group may be obtained, for example, after completing the operations 800 with a certain antenna grouping. For example, the operations 800 may be first performed using a separate group for each of the antennas/beams to obtain the backoff factors for individual antennas at block 902.

At block 904, it may be determined whether each of the backoff factors is greater than or equal to a threshold (for example, 0.5). If this condition is not satisfied, then at block 906, the antennas may be reassigned or redistributed among the antenna groups. In certain cases, for antennas/antenna groups that have a low backoff factor (e.g., a backoff factor<0.5), based on spatial distribution, some of the antennas can be grouped together into the same antenna group resulting in a reduction in the number of antenna groups. Suppose, for example, in the first iteration a separate group is used for each antenna, where antennas 1-7 are in antenna groups AG1 to AG7, respectively. The corresponding backoff factors are: bf1=bf2≈0.5, bf3≈1, bf4=bf5=bf6=bf7=0.25. Then, updated antenna groups may be AG1={Ant4, Ant5, Ant6, Ant7}, AG2={Ant1, Ant2}, and AG3={Ant3}. In certain cases, specific antennas may be grouped together such that the sum of the backoff factors for the specific antennas is above the threshold at block 904. At block 902, the operations 800 or a portion (e.g., blocks 806-816) of the operations 800 may be repeated to determine the updated backoff factors for the reassigned antenna groups. The antenna grouping/backoff factor generation may be repeated until all of the backoff factors satisfy the conditions at both block 810 and block 904. If the conditions at these blocks are satisfied, the antenna group assignment may be considered complete.

The antenna grouping operations described herein may be determined and/or applied per device state index (DSI) indicating a device's exposure scenario (e.g., head exposure, body exposure, or extremity exposure). For example, head exposure may have four exposure positions (right check, right tilt, left check, and left tilt), and these four positions can be collected together (e.g., at block 804, into a normalized map; in certain cases, the value of s will range from [1, 4], to account for the four exposure positions, where s represents a particular surface or position). Body exposure may have two exposure positions (front surface and back surface), and these two exposure positions can be collected together (e.g., at block 804). Extremity exposure may have six exposure positions at 0 mm separation distance (front, back, left, right, top, and bottom surfaces of device), and these six positions can be collected together (e.g., at block 804).

In certain aspects, the antenna grouping operations described herein can be combined with existing approaches for some exposure configurations, e.g., if the absolute sum of maximum RF exposure values for all antenna groups (e.g., total normalized composite map) is less than a regulatory limit, then the above procedure of adjusting the power/backoff factors may be skipped.

While the examples provided herein are described with respect to the UE performing various operations in determining the antenna grouping, aspects of the present disclosure may also apply to scenarios where the antenna grouping and backoff factor derivation operations are conducted in a laboratory setting (such as with the RF exposure measurement system 500), and certain calculations or simulations are performed external to the UE, for example, by a separate processing system (such as the processing system 502). That is, the various functions for antenna grouping and backoff factor derivation operations need not be done at the UE itself, but that the UE may be configured to store/access/utilize specific information derived from the antenna grouping operations, such as the backoff factors and antenna grouping assignments. For example, the antenna grouping assignments and corresponding backoff factors may be developed using (a prototype of) the wireless communication device in a laboratory setting (e.g., the RF exposure measurement system 500) to simulate various exposure/transmit scenarios during the RF exposure compliance certification process with a regulatory body, and the UE may be configured to store/access/utilize the backoff factors associated with the specific antenna groupings derived from the antenna grouping operations performed in the laboratory setting.

As an example, the UE may store and access various backoff factors associated with specific antenna groups and/or transmit beam configurations depending on the various RF exposure limit associated with the exposure/transmit scenarios (such as head exposure, body exposure, and/or extremity exposure at certain frequency bands). The backoff factors associated with the specific antenna groups and/or transit beam configurations may be developed according to the operations for assigning antenna groups as described herein, for example, using a prototype of the UE in a RF exposure testing laboratory. The backoff factors associated with the specific antenna groups may be arranged in a data structure, such as a table or database of backoff factors associated with specific antenna groupings at specific frequency bands and/or specific exposure/transmit scenarios.

While the examples provided herein are described with respect to the UE performing RF exposure compliance with the antenna grouping, aspects of the present disclosure are not limited to RF exposure use cases. For example, the stored values (e.g., the backoff factors and/or antenna grouping assignments) derived from the antenna grouping operations may be used for any number of applications. One application as further described below is to evaluate RF exposure compliance using the backoff factors and/or antenna groupings. Another application might be to determine self-interference among the antenna groupings based on transmission power levels. Other purposes are possible, as well.

In certain cases, an antenna may not meet exclusion criteria with another antenna group, and in such cases, that antenna can be incorporated into the other antenna group. In some cases, this may lead to all of the antennas being combined into a single antenna group, which implies that RF exposure from all antennas is collocated and does not take advantage of spatial diversity arising from antenna placement. One way to avoid this is to force the antenna to meet exclusion criteria by applying higher permanent backoff(s) to one or more antennas.

Aspects of the present disclosure relate to assigning an antenna to multiple antenna groups in a specific antenna grouping. For example, if an antenna does not meet the exclusion criteria with another antenna group, the antenna may be assigned to multiple antenna groups, which may avoid applying a permanent backoff to all of the antennas. The antenna grouping described herein may enable desirable transmit power for specific antenna groups and/or flexibility in complying with RF exposure limits per antenna group.

Aspects of the present disclosure relate to assigning one or more antennas to multiple sets of antenna groups (i.e., multiple antenna groupings), for example, for separate transmission scenarios. For example, the processing system may develop an antenna grouping for a specific country or region (which may be identified by public land mobile network (PLMN) code and/or a mobile country code (MCC), for example) due to separate RF exposure requirements for that country or region. In certain cases, the processing system may develop an antenna grouping for a specific exposure scenario, such as head exposure, body exposure, extremity exposure, and/or hotspot exposure (e.g., when the wireless communication device is not in close proximity to human tissue), and/or based on one or more operating conditions (whether MIMO is being utilized, for certain bands, when certain high priority applications or transmissions are likely to be active, etc.). Antenna groupings per transmission scenario (such as a specific region and/or exposure scenario) may provide flexibility for a wireless communication device to switch between antenna groupings depending on the transmission scenario encountered by the wireless communication device.

Returning to FIG. 6, the operations 600 may further involve the processing system (e.g., a UE, RF exposure measurement system, computer separate from the UE and/or any other device configured to perform the operations described herein) assigning at least one of the transmit antennas to two or more of the antenna groups at block 604. For example, the processing system may assign an antenna to multiple antenna groups due to the antenna not meeting exclusion criteria with other antenna groups. At block 604, the processing system may identify that at least one of the transmit antennas does not meet a mutually exclusive criterion with at least two of the antenna groups, and the processing system may assign the at least one of the transmit antennas to the at least two of the antenna groups in response to the identification.

In certain cases, an antenna may be assigned to multiple antenna groups based on the maximum time-averaged power limit ($P_{limit}$) associated with the antenna. The maximum time-averaged power limit may refer to the maximum constant transmit power an antenna can transmit continuously during the entire duration of a time window associated with an RF exposure limit in compliance with the RF exposure limit. For example, if a certain antenna has a relatively low $P_{limit}$ compared to the other antennas, the processing system may not repeat assigning that particular antenna in multiple antenna groups to avoid consuming RF exposure margin in those antenna groups. As an example, if a specific antenna has a relatively high $P_{limit}$, the processing system may assign that particular antenna to multiple antenna groups. Here, low or high $P_{limit}$ for a specific antenna (and a specific technology/frequency band) can be quantified by comparing the $P_{limit}$ against the maximum transmit power ($P_{max}$) supported by the hardware. In such scenarios, a peak-to-average-power ratio (PAPR) can be used as a metric to determine if $P_{limit}$ is relatively low or high. The PAPR in dB may be given by $P_{max}-P_{limit}$, where $P_{max}$ and $P_{limit}$ may be in dBm. For example, if PAPR is positive (say, a few dB, for example 2 dB, 3 dB, or 6 dB), then $P_{limit}$ may be considered low for that specific technology/band/antenna. Similarly, if PAPR is less than one of these example values or negative, then $P_{limit}$ may be considered high. With respect to the operations 600, the processing system may identify a maximum time-averaged power limit associated with each of the transmit antennas, and the processing system may assign at least one of the transmit antennas to at least two of the antenna groups based at least in part on the maximum time-averaged power limit associated with the at least one of the transmit antennas.

In certain aspects, the processing system may generate multiple antenna groupings. The antenna groupings may be developed for separate transmission scenarios, such as when a wireless communication device is located in a specific region and/or when the wireless communication device encounters a specific exposure scenario. With respect to the operations 600, the processing system may assign the transmit antennas to a first grouping of the antenna groups for a first transmission scenario (e.g., when the UE is located in the United States) and assign the transmit antennas to a second grouping of the antenna groups for a second transmission scenario (e.g., when the UE is located in the European Union).

In certain aspects, the first grouping may have a different arrangement of transmit antennas in the plurality of antenna groups than the second grouping. At least one of the transmit antennas is in both the first grouping and the second grouping. For example, referring to FIG. 7, the antennas 702a-702g may be assigned to a first grouping where the first antenna 702a, second antenna 702b, third antenna 702c, fourth antenna 702d, and fifth antenna 702e are assigned to a first group; and the fifth antenna 702e, sixth antenna 702f, and seventh antenna 702g are assigned to a second group. The first group may be spatially separated from the second group to provide a mutually exclusive relationship in terms of RF exposure. In this first grouping, the fifth antenna 702e is assigned to two different antenna groups (namely, the first and second groups). Due to the fifth antenna 702e being positioned between the set of top and bottom antennas (702a-d, 702f, and 702g), the fifth antenna 702e may be difficult to separate into a mutually exclusive group. For example, the fifth antenna 702e may interact with the other antennas (702a-d, 702f, and 702g), and to avoid applying a restrictive permanent backoff, the fifth antenna 702e may be assigned to the first group and second group.

The antennas 702a-702g may also be assigned to a second grouping, where the first antenna 702a, second antenna 702b, third antenna 702c, and fourth antenna 702d are assigned to a third group; the sixth antenna 702f and seventh antenna 702g are assigned to a fourth group; and the fourth antenna 702d, fifth antenna 702e, and seventh antenna 702g are assigned to a fifth group. In this second grouping, the fourth antenna 702d is assigned to two different antenna groups (namely, the third and fifth groups) and the sixth antenna 702g is assigned to two different antenna groups (namely, the fourth and fifth groups). In this second grouping, the fifth antenna 702e may again be difficult to assign to a separate group, and the fifth antenna 702e may be grouped with antennas spatially arranged on the same side of the wireless communication device 700, such as the fourth antenna 702d and seventh antenna 702g.

In certain cases, the first transmission scenario may be associated with a first country or region (e.g., the United States), and the second transmission scenario may be associated with a second country or region (e.g., China or the European Union). That is, the first and second transmission scenarios may depend on a specific region where the UE is located to comply with specific RF exposure limits for that region. When the UE is located in that specific region (for example as determined based on a PLMN code and/or an MCC provided to the UE), the UE may use a certain antenna grouping associated with that region.

In certain cases, the first transmission scenario may be associated with a first exposure scenario (e.g., head exposure), and the second transmission scenario may be associated with a second exposure scenario (e.g., body exposure). That is, the first and second transmission scenarios may depend on a specific exposure scenario, such as head exposure, body exposure, extremity exposure, and/or hotspot exposure. When the UE encounters a specific exposure scenario, the UE may use a certain antenna grouping associated with that exposure scenario.

In certain cases, the transmission scenarios may be associated with when certain antennas are used for concurrent transmissions. For example, suppose the fourth antenna 702d and seventh antenna 702g will be commonly used for concurrent transmissions. The processing system may assign these antennas to different groups to facilitate efficient use of the RF exposure margin for these antennas. As an example, the processing system may develop the first grouping as described herein with respect to FIG. 7 for when the fourth antenna 702d and seventh antenna 702g are used for concurrent transmissions to enable application of separate backoffs for these antennas.

With respect to the operations 600, a UE may transmit from at least one transmit antenna in the first grouping, during the first transmission scenario, and the UE may transmit, from at least one transmit antenna in the second grouping, during the second transmission scenario. In other words, the UE may select which antenna grouping to use for a specific transmission scenario, and the UE may switch between antenna groupings when there is a change in the transmission scenario, such as when the UE moves from one region to another region, for example, as further described herein with respect to FIG. 10.

Example Time-Averaged RF Exposure Per Transmit Antenna Group

Aspects of the present disclosure provide various techniques for determining time-averaged RF exposure compliance per transmit antenna group. As the antenna grouping described herein may provide mutually exclusive antenna groups in terms of RF exposure, the RF exposure compliance for each antenna group may be determined separately. In certain cases, the RF exposure compliance for the antenna groups may be conducted in parallel (e.g., concurrently together). The group-based RF exposure compliance described herein may enable desirable transmit power for specific antenna groups, for example, due to differing exposure scenarios encountered by each antenna group. The desirable transmit power may provide desirable uplink performance, such as desirable uplink data rates, uplink carrier aggregation, and/or an uplink connection at the edge of a cell.

Figure 10:
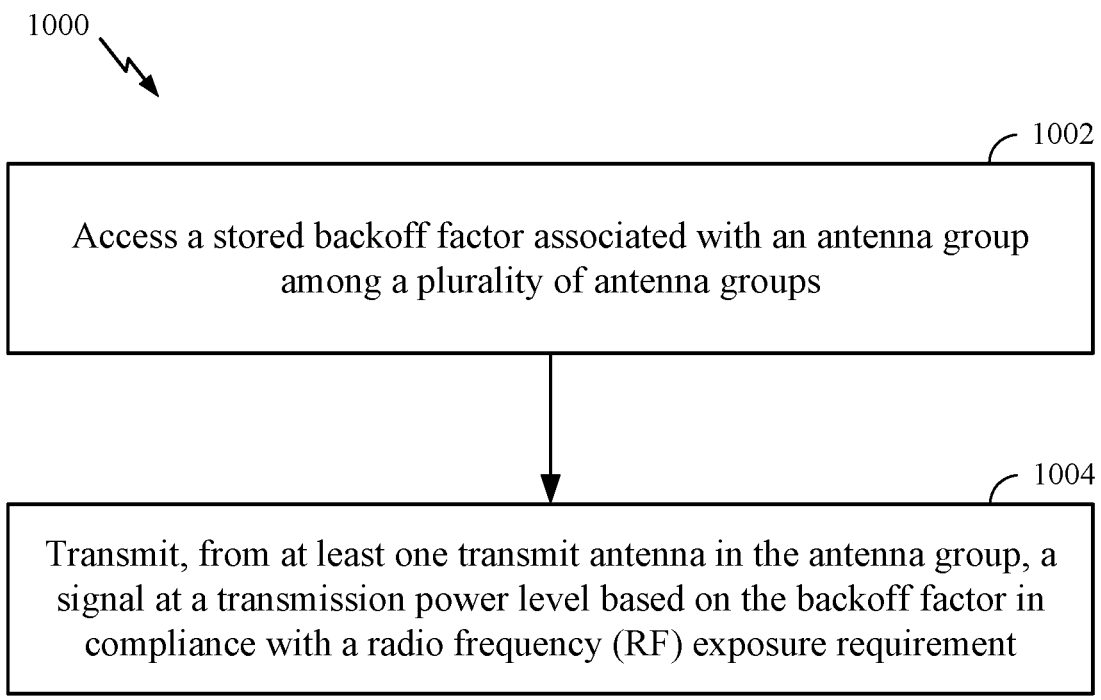
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., the UE 120a in the wireless communication network 100). The operations 1000 may be implemented as software components that are executed and run on one or more processors (e.g., controller/processor 280 of FIG. 2). Further, the transmission of signals by the UE in the operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1002, where the UE may access a stored backoff factor associated with an antenna group (e.g., the antenna group 704) among a plurality of antenna groups (e.g., the antenna groups 704, 706, 708). At block 1004, the UE may transmit, from at least one transmit antenna (e.g., the antenna 702a) in the antenna group, a signal at a transmission power level based on the backoff factor in compliance with an RF exposure requirement.

In certain cases, the grouping of the transmit antennas may not be an explicit indication of which antenna is in a specific group. In aspects, the grouping of the transmit antennas may be implicitly indicated by various backoff factors assigned to transmit antennas for specific exposure/transmit scenarios. That is, the antenna groupings and the antenna group assignments associated with the antenna grouping may be represented by backoff factors. For example, certain antennas may share the same backoff factor, such that these antennas are implicitly assigned to the same antenna group among a plurality of antenna groups. In aspects, the transmission power level may be based at least in part on at least one backoff factor of the backoff factors.

In certain aspects, the transmission power level may be determined based on a sum of the RF exposures being less than or equal to a threshold (e.g., 1.0). For example, the UE may transmit the signal at the transmission power level based on a sum of RF exposures for each of the antenna groups being less than or equal to a threshold. In some such scenarios, this is accomplished by applying the backoff factor(s) described above to transmission power levels.

In certain aspects, the transmission power level may be determined based on time-averaged RF exposure being less than the threshold. For example, the UE may transmit the signal at the transmission power level based on a time-averaged sum of RF exposures for each of the antenna groups being less than or equal to a threshold (e.g., 1.0). A backoff factor may be applied to the RF exposures for each of the antenna groups in the case of the sum of RF exposures or the time-averaged sum of RF exposures.

In aspects, the UE may determine time-averaged RF exposures for each of the antenna groups and use the group-based time-averaged RF exposures in determining RF exposure compliance. For example, the UE may transmit the signal at the transmission power level based on each of the time-averaged RF exposures being less than or equal to a threshold. In certain cases, because the antenna groups may be mutually exclusive from each other in terms of RF exposure, the UE may concurrently determine the time-averaged RF exposures for each of the antenna groups. In other words, the mutual exclusivity of the antenna groups may enable the UE to determine the time-averaged RF exposures for each of the antenna groups in parallel with (e.g., independent of) each other. Expressed another way, the UE may use parallel (or concurrent) processing to determine the time-averaged RF exposures for each or a portion of the antenna groups. For example, the UE may determine the time-averaged RF exposures associated with a first antenna group (e.g., the antenna group 704) while concurrently determining the time-averaged RF exposures associated with a second antenna group (e.g., the antenna group 706), and the UE may determine the transmit powers in compliance with RF exposure requirements for each of the first and second antenna groups based on the respective time-averaged RF exposures and respective backoff factors. In certain cases, the UE may transmit the signal at the transmission power level based on enforcing RF exposure compliance for one of the plurality of antenna groups having a transmit power limit less than another one of the plurality of antenna groups. That is, the minimum of multiple transmit power limits may be enforced by the transmitter to ensure overall time-averaged RF exposure compliance.

In aspects, the antennas may have various antenna groupings, for example, as described herein with respect to the operations 600. As an example, the UE may have backoff factors associated with antenna groups for mmWave bands, antenna groups for sub-6 GHz bands, and/or antenna groups for mixed-mode bands (sub-6 GHz bands and mmWave bands). In certain cases, the antenna grouping may be derived using the operations 600, 800, or 900. For example, at least one of the antenna groups may include a first antenna configured to transmit in a first mode and a second antenna configured to transmit in a second mode. In certain cases, the first mode may be sub-6 GHZ, and the second mode may be mmWave. That is, the first mode may be transmitting at a sub-6 GHz band, and the second mode may be transmitting at a mmWave band. In aspects, the first mode may include the first antenna being operable at a sub-6 GHz band, and the second mode may include the second antenna being operable at a mmWave band.

In certain aspects, the transmit antennas may include one or more first antennas configured to transmit in a first mode and one or more second antennas configured to transmit in a second mode. The first antenna(s) may be separately assigned to the antenna groups. That is, the first antennas may be divided into groups, such that some of the first antennas may be in the same group, but one of the first antennas may not be assigned to more than one group in a specific antenna grouping. The second antennas may be included in each or some of the antenna groups. In certain cases, each of the antenna groups may have all of the second antennas. In certain cases, the first mode may be transmitting at one or more frequencies below 6 GHz (e.g., at sub-6 GHz bands), and the second mode may be transmitting at one or more frequencies above 6 GHz (e.g., at mmWave bands). In other cases, the first mode may be transmitting at one or more frequencies above 6 GHz, and the second mode may be transmitting at one or more frequencies below 6 GHz.

In aspects, the transmit antennas are grouped such that each antenna group is mutually exclusive from all the other antenna groups in terms of RF exposure. The mutual exclusivity of the antenna groups may be accomplished using various techniques or criteria. For example, in a system of N antennas which are grouped into k antenna groups, first obtained normalized RF exposure distribution of each of i=1 to N antennas on all exposure surfaces of interest=normalized.map(s,x,y,z,i), represented in block 804, such that the maximum value of RF exposure distributions out of all surfaces is max {normalized.map(s,x,y,z)}=1.0. Then, obtain composite map out of all n antennas inside antenna group k=normalized.composite.map.$AG_k$(s,x,y,z)=max{normalized.map(s,x,y,z,i=1 to n)}, represented i in block 806, =normRFexposure(k,s,x,y,z). This normalized composite map is termed as normalized RF exposure for antenna group k. For example, the mutual exclusivity of the antenna groups may be provided if a sum of RF exposure of all antenna groups (k=1 to M)<1.0 satisfies the following expression:

$$\sum_{k=1}^{M} \{normRFexposure(k, s, x, y, z) * \text{predefined backoff}(k)\} < 1.0 \quad (9)$$

where the predefined backoff (k) is the backoff factor applied to all the antennas and/or antenna configuration of antenna group "k." The backoff factor may be determined based on the operations 600, 800, and/or 900, and/or the backoff factor may be stored by the UE (for example in the memory 282 or 338), and retrieved for use in performing the operations 1000. In certain cases, existing regulatory approaches that meet predefined criteria like SAR peak location separation ratio (SPLSR) may be used to determine such mutual exclusivity (for example, as described in Section 4.3.2c of the FCC KDB 447498 D01 General RF Exposure Guidance v06). In certain cases, the mutual exclusivity of the antenna groups may be determined by the sum of overlapped RF exposure distributions at specific backoff factors being less than or equal to a threshold (for example, 1.0). The predefined backoff factors are between [0, 1] and are applied on all the antennas belonging to that antenna group. This can be accomplished by lowering the maximum time-averaged transmission power limit of each antenna belonging to antenna group k by predefined backoff (k). Alternatively, the total RF exposure for all the antennas in the antenna group k at all spatial locations (s,x,y,z) shouldn't exceed RFexposurelimit*predefined backoff (k).

As the antenna groups are mutually exclusive, (real-time) averaging of RF exposure can be performed per antenna group (e.g., irrespective of the other antenna groups) using the methods described above or using one or more other methods. For example, RF exposure of a given antenna at any time instant t may be directly proportional to the transmission power of the antenna at t. Therefore, RF exposure for antenna i belonging to antenna group k at a time instant t may be given by:

$$RFexposure(i, t, s, x, y, z) = \frac{RFexposure\_peak(i, s, x, y, z)}{Tx\_power\_peak(i)} \times Tx\_power(i, t) \quad (10)$$

Time-averaged RF exposure of all n antennas and/or antenna configurations in an antenna group k over time-window T may be given by:

$$\frac{1}{T} \int_{t}^{t+T} \left[\sum_{i=1}^{n} \{RFexposure(i, t, s, x, y, z)\}\right] dt \leq \quad (11)$$

$$RFexposure_{limit} * \text{predefined backoff}(k).$$

The predefined backoff may be the backoff factor bf described herein.

When antennas and/or groups of antennas which use different mechanisms (e.g., SAR or PD) to calculate RF exposure are included in an antenna group, the exposures may be combined as described herein, or using one or more other methods or calculations.

Thus, transmission (power) using the antennas in the antenna groups may be controlled (e.g., by the processor 280) such that each group individually satisfies exposure requirements, for example as defined by a regulator of a domestic or foreign jurisdiction. In some aspects, this may result in total power transmitted across all of the antenna groups being higher than if the antennas were not divided into mutually exclusive groups.

In some cases, multiple sets of antenna groups (e.g., multiple antenna groupings) may be defined and used to determine (e.g., transmission power and/or backoff factors) settings for a plurality of transmitters and/or antennas. That is, the UE may be configured with multiple antenna groupings, where each antenna grouping has antenna groups that may be defined differently from the other antenna groupings. For example, referring to FIG. 7, the first antenna 702a, third antenna 702c, and fifth antenna 702e may be antenna modules having an antenna array configured to transmit at one or more mmWave bands (e.g., at approximately 24 GHz to 53 GHz or higher). The other antennas 702b, 702d, 702f, 702g may be configured to transmit at sub-6 GHz bands (e.g., 6 GHz or below).

A first antenna grouping (M1) may include three antenna groups, and a second antenna grouping (M2) may include two antenna groups. The antenna groups of the first antenna grouping (M1) may include a first antenna group (AG1) having all of the sub-6 GHz antennas 702b, 702d, 702f, 702g and the first antenna 702a, a second antenna group (AG2) having all of the sub-6 GHz antennas 702b, 702d, 702f, 702g and the third antenna 702c, and third antenna group (AG3) having all of the sub-6 GHz antennas 702b, 702d, 702f, 702g and the fifth antenna 702e. In aspects, the first antenna grouping (M1) may be expressed as follows:

AG1: {all sub-6 GHz antennas, first mmWave module}
AG2: {all sub-6 GHz antennas, second mmWave module}
AG3: {all sub-6 GHz antennas, third mmWave module}

The antenna groups of the second antenna grouping (M2) may include a fourth antenna group (AG4) having the second antenna 702b, fourth antenna 702d, and all of the mmWave antennas 702a, 702c, and 702e, and a fifth antenna group (AG5) having the sixth antenna 702f, seventh antenna 702g, and all of the mmWave antennas 702a, 702c, and 702e. The second antenna grouping may be expressed as follows:

AG4: {a first sub-group of sub-6 GHz antennas, all mmWave modules}
AG5: {a second sub-group of sub-6 GHz antennas, all mmWave modules} where the first sub-group may include the sub-6 GHz antennas arranged at the top of the UE (such as the second antenna 702b and fourth antenna 702d), and the second sub-group of sub-6 GHz may include the sub-6 GHz antennas arranged at the bottom of the UE (such as the sixth antenna 702f and seventh antenna 702g).

In some aspects, sub-6 GHz (e.g., frequency range 1 (FR1)) RF exposure may be calculated via measurements, and mmWave (e.g., frequency range 2 (FR2)) RF exposure (for beams in the codebook) may be calculated via simulations (e.g., as described above). In such cases, sub-6 GHz antennas may be grouped into M2 groups (with all mmWave modules in each of the groups), and mmWave antennas are grouped into M1 groups (with all sub-6 GHz antennas in each of the groups), as described above.

Those of skill in the art will understand that the groupings M1 and M2 are merely examples for arranging the antennas into groups to facilitate understanding. Aspects of the present disclosure may also be applied to arranging the antennas into additional or alternative groups, such as the groupings described above with respect to assigning an antenna to multiple groups. For example, all of either the FR1 or FR2 radios could be assigned to all of the antenna groups, and the other of the FR1 or FR2 radios could be non-uniquely spread out among the antenna groups. In one such example, an antenna grouping (M3) may include the fourth antenna group AG4 and the fifth antenna group AG5, plus an additional antenna group (AG6), having the second antenna 702b, the sixth antenna 702f, and all of the mmWave antennas 702a, 702c, and 702e. In another such example, an antenna grouping (M4) may include the fourth antenna group AG4 and a seventh antenna group (AG7), having the second antenna 702b, the sixth antenna 702f, the seventh antenna 702g, and all of the mmWave antennas 702a, 702c, and 702e.

In these examples, two or more determinations of time averaging may be performed (e.g., at least one for each set, for example according to one or more backoff values defined for the set). The processor 280 may determine to apply transmission settings to the antennas based on the results of the two or more determinations. In some embodiments, the minimum of transmit power limits across the multiple antenna groupings (e.g., M1 versus M2, or M1 versus M3 and/or M4) may be selected and effected by the processor 280, for example to ensure overall time-averaged RF exposure compliance.

In certain cases, the UE may access a stored backoff factor and transmit, from at least one antenna, the signal using a transmission power level based on the backoff factor in compliance with a radio frequency exposure requirement, as described herein. The backoff factor may correspond to at least one antenna group of a plurality of antenna groups, where the at least one antenna is in the at least one antenna group.

Example Selection and Switching Between Sets of Antenna Groups

Aspects of the present disclosure relate to selecting a set of antenna groups (also referred to herein as a "grouping") for operation by a wireless communications device (e.g., the UE 120). Operating with a particular set of antenna groups may be beneficial (e.g., by offering higher performance) for a certain radio transmission scenario. For example, when operating with the antenna groups (AG1, AG2, and AG3) of the first antenna grouping (M1), the mmW modules may get more combined total RF exposure margin, since each mmW module can get up to 100% RF exposure margin in this scenario (depending on how much margin the sub6 antennas consume). Therefore, when operating with LTE and Frequency Range 2 (FR2) in NR (e.g., an LTE+FR2 link), it may be beneficial to operate according to the M1 grouping. In contrast, when operating only with sub-6 GHz bands (e.g., LTE and Frequency Range 1 (FR1) in NR, such as in an LTE+FR1 link), it may be beneficial to operate according to the M2 grouping (with AG4 and AG5) or one of the M3 and M4 groupings, for example.

Aspects of the present disclosure also relate to switching between sets of antenna groups, such as when a wireless communications device (e.g., the UE 120) changes its operating parameters. When switching from one antenna grouping to another grouping (e.g., for performance benefits), RF exposure compliance should ideally be ensured, since the grouping assumptions may have changed. For example, when switching from the M1 grouping to the M2 grouping (or from the M1 grouping to one of the M3 and M4 groupings), if each mmW module had previously operated at 100% RF exposure margin, then upon switching to the M2 grouping (e.g., from an LTE+FR2 call to an LTE+FR1 call) or one of the M3 and M4 groupings, the time-history for all the antenna groups in the M1 grouping may now exceed the RF exposure compliance limit. Accordingly, aspects of the present disclosure provide one or more criteria for switching between different groupings (referred to herein as "switch criteria"), in an effort to maximize, or at least increase, the benefit of switching while simultaneously ensuring RF exposure compliance.

For example, assume there are a total of "B" mmW groups in the M1 grouping (with all sub-6 GHz groups added to each of the mmW groups) and "A" sub-6 GHz groups in the M2 grouping (with all mmW groups added to each of the sub6 groups). In this case, the total RF exposure margin available in the M1 grouping=100%−(sub6_1+sub6_2+ . . . +sub6_A)−max{mmW_1, mmW_2, . . . , mmW_B}, and the total RF exposure margin available in the M2 grouping=100%−(mmW_1+mmW_2+ . . . +mmW_B)−max{sub6_1, sub6_2, . . . , sub6_A}. The switch criteria to change from the M1 grouping to the M2 grouping (e.g., LTE+FR2 call handover to LTE+FR1 call) may include the total available margin (TAM) in the M2 grouping being greater than the total available margin in the M1 grouping (TAM, M2>TAM, M1). Similarly, the switch criteria to change from the M2 grouping to the M1 grouping (e.g., LTE+FR1 call handover to LTE+FR2 call) may include the total available margin in the M1 grouping being greater than the total available margin in the M2 grouping (TAM, M1>TAM, M2).

The above example had only two different sets of antenna groups (the M1 and M2 groupings). However, this concept and the criteria for switching between antenna groups may be extended to more than two different groupings (e.g., to M3 and M4 also, or to using M3 and M4 in place of M2 in the example above). In general, the switch criteria to change from one radio configuration to another may include the total available margin in the new grouping being greater than the total available margin in the current (old) grouping.

Furthermore, the decision to switch between sets of antenna groups may be based on one or more criteria in addition to the total available margin. For example, in a combined transmission scenario of multiple sub-6 GHz radios and multiple mmW radios, the wireless communications device may use the priority of the radios to select operation with a specific set of antenna groups that provides the maximum total available margin to the highest priority radio. In other words, the wireless communications device may select the grouping that divides the antennas related to the highest priority radio into the maximum number of antenna groups.

Returning to FIG. 10, the operations 1000 may further involve the UE selecting a first grouping in the plurality of antenna groups based on one or more criteria. For certain aspects, the antenna group in block 1002 is in the first grouping, and the backoff factor in block 1002 is among a plurality of stored backoff factors for the first grouping and is associated with the antenna group in the first grouping. In this case, the one or more criteria may include total RF exposure margins available for different groupings in the plurality of antenna groups, including for the first grouping. For certain aspects, the one or more criteria may also include a priority of a radio type.

According to certain aspects, the operations 1000 may further involve the UE selecting a second grouping in the plurality of antenna groups based on the one or more criteria; accessing another stored backoff factor associated with an antenna group in the second grouping; and transmitting, from at least one transmit antenna in the antenna group in the second grouping, another signal at another transmission power level based on the other backoff factor in compliance with the RF exposure requirement. In this case, the one or more criteria may include total RF exposure margins available for different groupings in the plurality of antenna groups, including for the first grouping and for the second grouping. In addition, the total RF exposure margin available for the second grouping may be greater than the total RF exposure margin available for the first grouping at a time of selecting the second grouping.

According to certain aspects, the accessing at block 1002 may include accessing a first stored backoff factor associated with a first antenna group in a first grouping in the plurality of antenna groups. In this case, the operations 1000 may further involve the UE accessing a second stored backoff factor associated with a second antenna group in a second grouping in the plurality of antenna groups, based on one or more switching criteria.

For certain aspects, a wireless communications device (e.g., a UE) may select a specific antenna grouping, such as M1, M2, or one of several antenna groupings where all FR2 antennas are assigned to every antenna group and FR1 antennas are distributed among the antenna groups such that at least one of the FR1 antennas is assigned to multiple antenna groups (e.g., select between M3 and M4). The wireless communications device may select the antenna grouping for a specific transmission scenario, for example, as described herein with respect to the operations 600 for grouping antennas for RF exposure compliance. As an example, the wireless communications device may select an antenna grouping for a specific region, when the wireless communications device is located in that region. In certain cases, the wireless communications device may select an antenna grouping for a specific exposure scenario, such as when the wireless communications device is in close proximity to a user's head, arm, or abdomen. In certain cases, the wireless communications device may select an antenna grouping for when certain antennas are being used for concurrent transmissions. Further, the wireless device may select an antenna grouping based on a combination of these factors, for example based on a specific region and total available margin in groupings that correspond to or can be used within that specific region.

Example Communications Device

Figure 11:
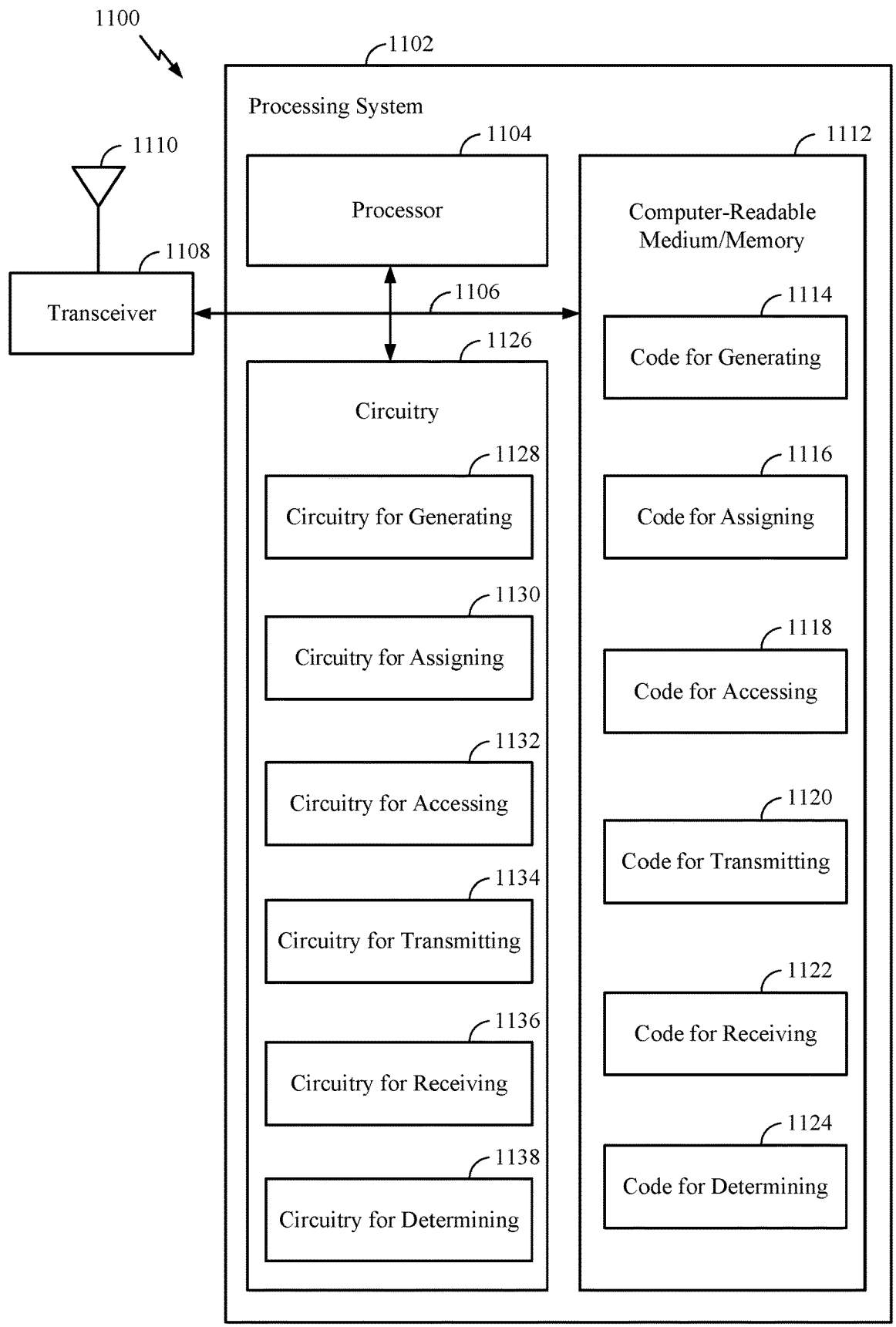
FIG. 11 illustrates a communications device (e.g., a UE) that may include various components configured to perform operations for the techniques disclosed herein, in accordance with certain aspects of the present disclosure.

FIG. 11 illustrates a communications device 1100 (e.g., the UE 120) that may include various components (e.g., corresponding to means-plus-function components) configured to perform operations for the techniques disclosed herein, such as the operations illustrated in FIG. 6 and/or FIG. 10. The communications device 1100 includes a processing system 1102, which may be coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6 and/or FIG. 10, or other operations for performing the various techniques discussed herein for providing RF exposure compliance. In certain aspects, computer-readable medium/memory 1112 stores code for generating 1114, code for assigning 1116, code for accessing 1118, code for transmitting 1120, code for receiving (or obtaining) 1122, and/or code for determining (e.g., code for generating and/or code for receiving) 1124. In certain aspects, the processing system 1102 has circuitry 1126 configured to implement the code stored in the computer-readable medium/memory 1112. In certain aspects, the circuitry 1126 is coupled to the processor 1104 and/or the computer-readable medium/memory 1112 via the bus 1106. For example, the circuitry 1126 includes circuitry for generating 1128, circuitry for assigning 1130, circuitry for accessing 1132, circuitry for transmitting 1134, circuitry for receiving (or obtaining) 1136, and/or circuitry for determining (e.g., circuitry for generating and/or circuitry for receiving) 1138.

Example Aspects

In addition to the various aspects described above, specific combinations of aspects are within the scope of the disclosure, some of which are detailed below:

Aspect 1: A method of wireless communication by a user equipment, comprising: accessing a stored backoff factor associated with an antenna group among a plurality of antenna groups; and transmitting, from at least one transmit antenna in the antenna group, a signal at a transmission power level based on the backoff factor in compliance with a radio frequency (RF) exposure requirement.

Aspect 2: The method according to Aspect 1, wherein transmitting the signal at the transmission power level comprises transmitting the signal at the transmission power level based on a sum of RF exposures for each of the antenna groups being less than or equal to a threshold.

Aspect 3: The method according to Aspect 1, wherein transmitting the signal at the transmission power level comprises transmitting the signal at the transmission power level based on a time-averaged sum of RF exposures for each of the antenna groups being less than or equal to a threshold.

Aspect 4: The method according to Aspect 2 or 3, wherein the backoff factor comprises a plurality of backoff factors, and each of the backoff factors is associated with a separate antenna group among the plurality of antenna groups such that a separate backoff factor among the plurality of backoff factors is applied to the sum of the RF exposures for each of the antenna groups.

Aspect 5: The method according to any of Aspects 1-4, further comprising determining time-averaged RF exposures for each of the antenna groups, wherein transmitting the signal at the transmission power level comprises transmitting the signal at the transmission power level based on each of the time-averaged RF exposures being less than or equal to a threshold.

Aspect 6: The method according to Aspect 5, wherein determining the time-averaged RF exposures comprises concurrently determining the time-averaged RF exposures for each of the antenna groups.

Aspect 7: The method according to any of Aspects 1-6, wherein transmitting the signal at the transmission power level comprises transmitting the signal at the transmission power level based on enforcing RF exposure compliance for one of the plurality of antenna groups having a transmit power limit less than another one of the plurality of antenna groups.

Aspect 8: The method according to any of Aspects 1-7, wherein at least one of the antenna groups comprises a first antenna configured to transmit in a first mode and a second antenna configured to transmit in a second mode.

Aspect 9: The method according to Aspect 8, wherein the first mode is a sub-6 GHz band transmission mode and wherein the second mode is a millimeter wave (mmWave) band transmission mode.

Aspect 10: The method according to any of Aspects 1-9, wherein: the plurality of antenna groups comprises a plurality of transmit antennas; the transmit antennas comprise one or more first antennas configured to transmit in a first mode and one or more second antennas configured to transmit in a second mode; the one or more first antennas are separately assigned to the antenna groups; and the one or more second antennas are included in each of the antenna groups.

Aspect 11: The method according to Aspect 10, wherein transmitting in the first mode involves transmitting at one or more frequencies below 6 GHz, and wherein transmitting in the second mode involves transmitting at one or more frequencies above 6 GHz.

Aspect 12: The method according to any of Aspects 1-11, wherein the plurality of antenna groups are represented by one or more backoff factors including the backoff factor.

Aspect 13: The method according to any of Aspects 1-12, further comprising selecting a first grouping in the plurality of antenna groups based on one or more criteria, wherein the antenna group is in the first grouping and wherein the backoff factor is among a plurality of stored backoff factors for the first grouping and is associated with the antenna group in the first grouping.

Aspect 14: The method according to Aspect 13, wherein the one or more criteria comprise total RF exposure margins available for different groupings in the plurality of antenna groups, including for the first grouping.

Aspect 15: The method according to Aspect 13, wherein the one or more criteria comprise: total RF exposure margins available for different groupings in the plurality of antenna groups; and a priority of a radio type.

Aspect 16: The method according to Aspect 13, further comprising: selecting a second grouping in the plurality of antenna groups based on the one or more criteria; accessing another stored backoff factor associated with an antenna group in the second grouping; and transmitting, from at least one transmit antenna in the antenna group in the second grouping, another signal at another transmission power level based on the other backoff factor in compliance with the RF exposure requirement.

Aspect 17: The method according to Aspect 16, wherein: the one or more criteria comprise total RF exposure margins available for different groupings in the plurality of antenna groups, including for the first grouping and for the second grouping; and the total RF exposure margin available for the second grouping is greater than the total RF exposure margin available for the first grouping at a time of selecting the second grouping.

Aspect 18: The method according to any of Aspects 1-12, wherein the accessing comprises accessing a first stored backoff factor associated with a first antenna group in a first grouping in the plurality of antenna groups, the method further comprising accessing a second stored backoff factor associated with a second antenna group in a second grouping in the plurality of antenna groups, based on one or more switching criteria.

Aspect 19: An apparatus for wireless communication, comprising: a memory; a processor coupled to the memory, the processor and the memory being configured to access a stored backoff factor associated with an antenna group among a plurality of antenna groups; and a transmitter configured to transmit, from at least one transmit antenna in the antenna group, a signal at a transmission power level based on the backoff factor in compliance with a radio frequency (RF) exposure requirement.

Aspect 20: The apparatus according to Aspect 19, wherein the transmitter is configured to transmit the signal at the transmission power level based on a sum of RF exposures for each of the antenna groups being less than or equal to a threshold.

Aspect 21: The apparatus according to Aspect 19, wherein the transmitter is configured to transmit the signal at the transmission power level based on a time-averaged sum of RF exposures for each of the antenna groups being less than or equal to a threshold.

Aspect 22: The apparatus according to Aspect 20 or 21, wherein the backoff factor is applied to the RF exposures for each of the antenna groups.

Aspect 23: The apparatus according to any of Aspects 19-22, wherein: the processor and the memory are further configured to determine time-averaged RF exposures for each of the antenna groups; and the transmitter is configured to transmit the signal at the transmission power level based on each of the time-averaged RF exposures being less than or equal to a threshold.

Aspect 24: The apparatus according to Aspect 23, wherein the processor and the memory are configured to concurrently determine the time-averaged RF exposures for each of the antenna groups.

Aspect 25: The apparatus according to any of Aspects 19-24, wherein the transmitter is configured to transmit the signal at the transmission power level based on enforcing RF exposure compliance for one of the plurality of antenna groups having a transmit power limit less than another one of the plurality of antenna groups.

Aspect 26: The apparatus according to any of Aspects 19-25, wherein at least one of the antenna groups comprises a first antenna configured to transmit in a first mode and a second antenna configured to transmit in a second mode.

Aspect 27: The apparatus according to Aspect 26, wherein the first mode is a sub-6 GHz band transmission mode and wherein the second mode is a millimeter wave (mmWave) band transmission mode.

Aspect 28: The apparatus according to any of Aspects 19-27, wherein: the plurality of antenna groups comprises a plurality of transmit antennas; the transmit antennas comprise one or more first antennas configured to transmit in a first mode and one or more second antennas configured to transmit in a second mode; the one or more first antennas are separately assigned to the antenna groups; and the one or more second antennas are included in each of the antenna groups.

Aspect 29: The apparatus according to Aspect 28, wherein to support the first mode, the one or more first antennas are operable at one or more frequencies below 6 GHz, and wherein to support the second mode, the one or more second antennas are operable at one or more frequencies above 6 GHz.

Aspect 30: The apparatus according to any of Aspects 19-29, wherein the plurality of antenna groups are represented by one or more backoff factors including the backoff factor.

Aspect 31: An apparatus for wireless communication, comprising: means for accessing a stored backoff factor associated with an antenna group among a plurality of antenna groups; and means for transmitting, from at least one transmit antenna in the antenna group, a signal at a transmission power level based on the backoff factor in compliance with a radio frequency (RF) exposure requirement.

Aspect 32: The apparatus of Aspect 31, the apparatus comprising means for performing any of Aspects 1 through 18.

Aspect 33: A computer-readable medium having instructions stored thereon to perform any of Aspects 1 through 18.

Aspect 34: A method of grouping antennas, comprising: determining radio frequency (RF) exposure distributions per transmit antenna configuration for a plurality of transmit antennas; and assigning the plurality of transmit antennas to a plurality of antenna groups based at least in part on the RF exposure distributions.

Aspect 35: The method of Aspect 34, further comprising: determining a backoff factor for at least one of the plurality of antenna groups; and transmitting, from at least one antenna in the at least one of the plurality of antenna groups, using a transmission power level based on the backoff factor, wherein the transmitting is performed by a user equipment (UE).

Aspect 36: The method according to Aspect 34 or 35, wherein assigning the plurality of transmit antennas to the plurality of antenna groups comprises: generating normalized distributions of the RF exposure distributions; generating a normalized composite map of the normalized distributions for each of the antenna groups; and generating a total of the normalized composite maps for all of the antenna groups based on a backoff factor associated with each of the antenna groups.

Aspect 37: The method of Aspect 36, wherein: generating the normalized distributions comprises dividing the RF exposure distributions by a maximum RF exposure value for a corresponding transmit antenna configuration; generating the normalized composite map comprises selecting a maximum of the normalized distributions as the normalized composite map for each of the antenna groups; and generating the total of the normalized composite maps comprises: multiplying the normalized composite map for each antenna group with the associated backoff factor to generate a weighted normalized composite map for each antenna group; and summing the weighted normalized composite maps together.

Aspect 38: The method according to Aspect 36 or 37, wherein generating the total of the normalized composite maps comprises adjusting at least one of the backoff factors and applying the adjusted at least one of the backoff factors to generating the total of the normalized composite maps until the total of the normalized composite maps is less than or equal to a threshold.

Aspect 39: The method according to any of Aspects 36-38, wherein assigning the plurality of transmit antennas to the plurality of antenna groups comprises: determining the backoff factors for a first grouping of the antenna groups; and assigning the transmit antennas to a second grouping of the antenna groups, if at least one of the backoff factors for the first grouping is less than a threshold.

Aspect 40: The method of Aspect 39, wherein assigning the plurality of transmit antennas to the plurality of antenna groups further comprises: determining the backoff factors for the second grouping of the antenna groups; and assigning the transmit antennas to a third grouping of the antenna groups, if at least one of the backoff factors for the second group is less than the threshold, wherein the third grouping includes at least two antenna groups having multiple transmit antennas in each of the at least two antenna groups.

Aspect 41: The method according to any of Aspects 36-40, wherein: the first grouping comprises a separate antenna group for each transmit antenna; and the second grouping comprises at least one antenna group having multiple transmit antennas.

Aspect 42: The method according to any of Aspects 34-41, wherein at least one of the antenna groups comprises a first antenna configured to transmit in a first mode and a second antenna configured to transmit in a second mode.

Aspect 43: The method of Aspect 42, wherein the first mode is a sub-6 GHZ band transmission mode, and wherein the second mode is a millimeter wave (mmWave) band transmission mode.

Aspect 44: The method according to Aspect 42 or 43, wherein the first antenna has a plurality of transmit antenna configurations, each of the plurality of transmit antenna configurations being associated with one or more bands of the first mode, and wherein the RF exposure distributions comprise a set of RF exposure distributions associated with the plurality of transmit antenna configurations of the first antenna.

Aspect 45: The method according to any of Aspects 34-44, wherein at least one of the transmit antennas is part of an antenna module having multiple antennas.

Aspect 46: The method according to any of Aspects 34-45, further comprising transmitting a signal, by a user equipment, at a transmission power level based on enforcing RF exposure compliance for at least one of the antenna groups.

Aspect 47: The method according to any of Aspects 34-46, wherein the assigning comprises assigning each of the plurality of transmit antennas to one of the plurality of antenna groups based on the RF exposure distributions, such that no transmit antenna is in multiple antenna groups.

Aspect 48: The method according to any of Aspects 34-46, wherein the assigning comprises assigning at least one of the transmit antennas to two or more of the plurality of antenna groups based at least in part on the RF exposure distributions.

Aspect 49: The method according to any of Aspects 34-48, wherein the assigning comprises: identifying that at least one of the transmit antennas does not meet a mutually exclusive criterion with at least two of the antenna groups; and assigning the at least one of the transmit antennas to the at least two of the antenna groups in response to the identification.

Aspect 50: The method according to any of Aspects 34-49, wherein the assigning comprises: identifying a maximum time-averaged power limit associated with each of the transmit antennas; and assigning at least one of the transmit antennas to at least two of the antenna groups based at least in part on the maximum time-averaged power limit associated with the at least one of the transmit antennas.

Aspect 51: The method according to any of Aspects 34-50, wherein the assigning comprises: assigning the transmit antennas to a first grouping of the antenna groups for a first transmission scenario; and assigning the transmit antennas to a second grouping of the antenna groups for a second transmission scenario.

Aspect 52: The method of Aspect 51, wherein the first transmission scenario is associated with a first country or region, and wherein the second transmission scenario is associated with a second country or region.

Aspect 53: The method according to any of Aspects 51 or 52, wherein the first transmission scenario is associated with a first exposure scenario and wherein the second transmission scenario is associated with a second exposure scenario.

Aspect 54: The method according to any of Aspects 51-53, wherein the first grouping has a different arrangement of transmit antennas in the plurality of antenna groups than the second grouping.

Aspect 55: The method according to any of Aspects 51-54, wherein at least one of the transmit antennas is in both the first grouping and the second grouping.

Aspect 56: The method according to any of Aspects 51-55, further comprising: transmitting, from at least one transmit antenna in the first grouping, during the first transmission scenario; and transmitting, from at least one transmit antenna in the second grouping, during the second transmission scenario.

Aspect 57: The method according to any of Aspects 34-56, wherein the assigning comprises assigning all FR2 antennas to all of the antenna groups, and distributing FR1 antennas across the antenna groups such that at least one of the FR1 antennas is in multiple of the antenna groups.

Aspect 58: An apparatus for grouping antennas, comprising: a memory and a processor coupled to the memory, the processor and the memory being configured to: determine radio frequency (RF) exposure distributions per transmit antenna configuration for a plurality of transmit antennas, and assign the plurality of transmit antennas to a plurality of antenna groups based at least in part on the RF exposure distributions.

Aspect 59: The apparatus according to Aspect 58, wherein the processor and the memory are further configured to: determine a backoff factor for at least one of the plurality of antenna groups; and transmit, from at least one antenna in the at least one of the plurality of antenna groups, using a transmission power level based on the backoff factor, wherein the transmitting is performed by a user equipment (UE).

Aspect 60: The apparatus according to Aspect 58 or 59, wherein the processor and the memory are further configured to assign at least one of the transmit antennas to two or more of the plurality of antenna groups based at least in part on the RF exposure distributions.

Aspect 61: The apparatus according to any of Aspects 58-60, wherein the processor and the memory are further configured to: identify that at least one of the transmit antennas does not meet a mutually exclusive criterion with at least two of the antenna groups; and assign the at least one of the transmit antennas to the at least two of the antenna groups in response to the identification.

Aspect 62: The apparatus according to any of Aspects 58-61, wherein the processor and the memory are further configured to: identify a maximum time-averaged power limit associated with each of the transmit antennas; and assign at least one of the transmit antennas to at least two of the antenna groups based at least in part on the maximum time-averaged power limit associated with the at least one of the transmit antennas.

Aspect 63: The apparatus according to any of Aspects 58-62, wherein the processor and the memory are further configured to: assign the transmit antennas to a first grouping of the antenna groups for a first transmission scenario; and assign the transmit antennas to a second grouping of the antenna groups for a second transmission scenario.

Aspect 64: An apparatus, comprising: a memory comprising executable instructions and one or more processors configured to execute the executable instructions and cause the apparatus to perform a method in accordance with any of Aspects 1-18 or 34-57.

Aspect 65: An apparatus, comprising means for performing a method in accordance with any of Aspects 1-18 or 34-57.

Aspect 66: A computer-readable medium comprising executable instructions that, when executed by one or more processors of an apparatus, cause the apparatus to perform a method in accordance with any of Aspects 1-18 or 34-57.

Aspect 67: A computer program product embodied on a computer-readable storage medium comprising code for performing a method in accordance with any of Aspects 1-18 or 34-57.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, which may be narrowband IoT (NB-IOT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of grouping antennas, comprising:
    determining radio frequency (RF) exposure per transmit antenna configuration for a plurality of transmit antennas;
    assigning the plurality of transmit antennas to a plurality of antenna groups based at least in part on the RF exposures; and
    determining one or more backoff factors, each of the one or more backoff factors being for a respective antenna group of the plurality of antenna groups, wherein a mutually exclusive criterion for RF exposure is met when the one or more backoff factors are applied and wherein the mutually exclusive criterion is not met when none of the one or more backoff factors are applied.

2. The method of claim 1, wherein the mutually exclusive criterion is not met when at least one of the one or more backoff factors is not applied.

3. The method of claim 1, wherein at least one of the plurality of antenna groups comprises a first antenna configured to transmit in a first mode and a second antenna configured to transmit in a second mode.

4. The method of claim 1, wherein the plurality of transmit antennas are assigned to the plurality of antenna groups based at least in part on the RF exposures, such that no transmit antenna is in multiple antenna groups.

5. The method of claim 1, wherein the plurality of transmit antennas are assigned to the plurality of antenna groups based at least in part on the RF exposures, such that at least one of the transmit antennas is assigned to two or more of the plurality of antenna groups.

6. The method of claim 1, wherein assigning the plurality of transmit antennas to the plurality of antenna groups comprises:
    assigning the plurality of transmit antennas to a first grouping of the plurality of antenna groups for a first transmission scenario; and
    assigning the plurality of transmit antennas to a second grouping of the plurality of antenna groups for a second transmission scenario.

7. The method of claim 6, wherein the first transmission scenario is associated with a first country or region and wherein the second transmission scenario is associated with a second country or region.

8. The method of claim 6, wherein the first transmission scenario is associated with a first exposure scenario, and wherein the second transmission scenario is associated with a second exposure scenario.

9. The method of claim 6, wherein at least one of the plurality of transmit antennas is in both the first grouping and the second grouping.

10. The method of claim 1, further comprising transmitting, from at least one antenna in at least one of the plurality of antenna groups, using a transmission power level based on the respective backoff factor for the at least one of the plurality of antenna groups.

11. The method of claim 1, further comprising determining a respective time-averaged RF exposure for each of the plurality of antenna groups.

12. The method of claim 11, wherein the time-averaged RF exposures for two or more of the plurality of antenna groups are determined in parallel.

13. The method of claim 1, wherein the RF exposure determined per transmit antenna configuration for the plurality of transmit antennas comprises one or more RF exposure distributions per transmit antenna configuration for the plurality of transmit antennas.

14. An apparatus for grouping antennas, comprising:
    memory storing instructions; and
    one or more processors coupled to the memory, the one or more processors being collectively configured to execute the instructions to cause the apparatus to:
        determine radio frequency (RF) exposure per transmit antenna configuration for a plurality of transmit antennas;
        assign the plurality of transmit antennas to a plurality of antenna groups based at least in part on the RF exposures; and
        determine one or more backoff factors, each of the one or more backoff factors being for a respective antenna group of the plurality of antenna groups, wherein a mutually exclusive criterion for RF exposure is met when the one or more backoff factors are applied and wherein the mutually exclusive criterion is not met when none of the one or more backoff factors are applied.

15. The apparatus of claim 14, wherein the mutually exclusive criterion is not met when at least one of the one or more backoff factors is not applied.

16. The apparatus of claim 14, wherein at least one of the plurality of antenna groups comprises a first antenna configured to transmit in a first mode and a second antenna configured to transmit in a second mode.

17. The apparatus of claim 14, wherein the plurality of transmit antennas are assigned to the plurality of antenna groups based at least in part on the RF exposures, such that at least one of the transmit antennas is assigned to two or more of the plurality of antenna groups.

18. The apparatus of claim 14, wherein, to assign the plurality of transmit antennas to the plurality of antenna groups, the one or more processors are collectively configured to execute the instructions to cause the apparatus to:
  assign the plurality of transmit antennas to a first grouping of the plurality of antenna groups for a first transmission scenario; and
  assign the plurality of transmit antennas to a second grouping of the plurality of antenna groups for a second transmission scenario.

19. The apparatus of claim 14, wherein the one or more processors are collectively configured to execute the instructions to further cause the apparatus to transmit, from at least one antenna in in at least one of the plurality of antenna groups, using a transmission power level based on the respective backoff power for the at least one of the plurality of antenna groups.

20. An apparatus for grouping antennas, comprising:
  means for determining radio frequency (RF) exposure per transmit antenna configuration for a plurality of transmit antennas;
  means for assigning the plurality of transmit antennas to a plurality of antenna groups based at least in part on the RF exposures; and
  means for determining one or more backoff factors, each of the one or more backoff factors being for a respective antenna group of the plurality of antenna groups, wherein a mutually exclusive criterion for RF exposure is met when the one or more backoff factors are applied and wherein the mutually exclusive criterion is not met when none of the one or more backoff factors are applied.

* * * * *